(12) United States Patent
Barkan et al.

(10) Patent No.: US 6,616,049 B1
(45) Date of Patent: Sep. 9, 2003

(54) RETAIL SALES CUSTOMER MARKETING SYSTEM WITH ELECTRONIC COUPON PROCESSING

(75) Inventors: Edward Barkan, Miller Place, NY (US); Thomas D. Bianculli, East Northport, NY (US); Mehul Patel, Fort Salonga, NY (US); Robert Sanders, St. James, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 10/112,102

(22) Filed: Mar. 29, 2002

Related U.S. Application Data

(63) Continuation-in-part of application No. 10/005,957, filed on Nov. 8, 2001.
(60) Provisional application No. 60/334,816, filed on Oct. 31, 2001, and provisional application No. 60/282,892, filed on Apr. 10, 2001.

(51) Int. Cl.$^7$ .................................................. G06K 7/10
(52) U.S. Cl. ................................. 235/472.03; 235/383
(58) Field of Search ............................... 235/383, 472.03

(56) References Cited

U.S. PATENT DOCUMENTS

| | | |
|---|---|---|
| 4,323,773 A | 4/1982 | Carpenter |
| 4,345,315 A | 8/1982 | Cadotte et al. |
| 4,415,065 A | 11/1983 | Sandstedt |
| 4,703,423 A | 10/1987 | Bado et al. |
| 4,727,245 A | 2/1988 | Dobbins et al. |
| 4,776,295 A | 10/1988 | Kline et al. |
| 4,973,952 A | 11/1990 | Malec et al. |
| 5,012,349 A | 4/1991 | de Fay |
| 5,013,387 A | 5/1991 | Goodwin et al. |
| 5,047,614 A | 9/1991 | Bianco |
| 5,064,012 A | 11/1991 | Losego |
| 5,189,291 A | 2/1993 | Siemiatkowski |
| 5,250,789 A | 10/1993 | Johnsen |
| 5,288,980 A | 2/1994 | Patel et al. |
| 5,295,064 A | 3/1994 | Malec et al. |
| 5,323,098 A | 6/1994 | Hamaguchi et al. |
| 5,340,971 A | 8/1994 | Rockstein et al. |
| 5,361,871 A | 11/1994 | Gupta et al. |
| 5,369,571 A | 11/1994 | Metts |
| 5,382,778 A | 1/1995 | Takahira et al. |

(List continued on next page.)

FOREIGN PATENT DOCUMENTS

| | | |
|---|---|---|
| GB | 2286567 | 2/1994 |
| JP | 0840276 | 2/1996 |

*Primary Examiner*—Harold I. Pitts

(57) ABSTRACT

A sales incentive system utilizing a portable handheld optical code reader for use by a consumer for scanning bar code symbols corresponding to product items to be purchased, including a memory for storing symbol data of items scanned by the reader a computer receives the stored data associated with the scanned items from the memory of the reader, and selectively generates coupon information based upon sales offers for specific products currently available based upon an analysis of the stored data by the computer. A printer may be coupled to the computer for printing at the consumer's location a set of coupons corresponding to the coupon information transferred from the computer to the consumer's location.

9 Claims, 9 Drawing Sheets

OTHER PUBLICATIONS

| | | |
|---|---|---|
| 5,448,046 A | 9/1995 | Swartz |
| 5,484,991 A | 1/1996 | Sherman et al. |
| 5,485,579 A | 1/1996 | Hitz et al. |
| 5,493,107 A | 2/1996 | Gupta et al. |
| 5,534,684 A | 7/1996 | Danielson |
| 5,640,193 A | 6/1997 | Wellner |
| 5,664,110 A | 9/1997 | Green et al. |
| 5,671,362 A | 9/1997 | Cowe et al. |
| 5,701,451 A | 12/1997 | Rogers et al. |
| 5,715,453 A | 2/1998 | Stewart |
| 5,732,074 A | 3/1998 | Spaur et al. |
| 5,732,219 A | 3/1998 | Blumer et al. |
| 5,804,803 A | 9/1998 | Cragun et al. |
| 5,841,365 A | 11/1998 | Rimkus |
| 5,887,271 A | 3/1999 | Powell |
| 5,909,492 A | 6/1999 | Payne et al. |
| 5,963,916 A | 10/1999 | Kaplan |
| 5,978,773 A | 11/1999 | Hudetz et al. |
| 6,540,137 B1 * | 4/2003 | Forsythe .................... 235/383 |

* cited by examiner

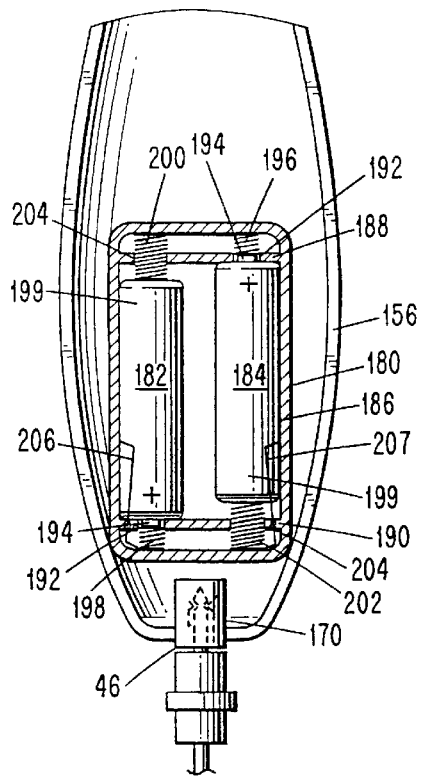
FIG. 9
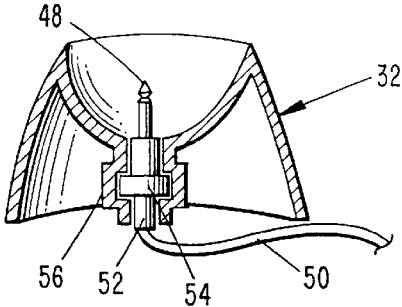
FIG. 4(a)
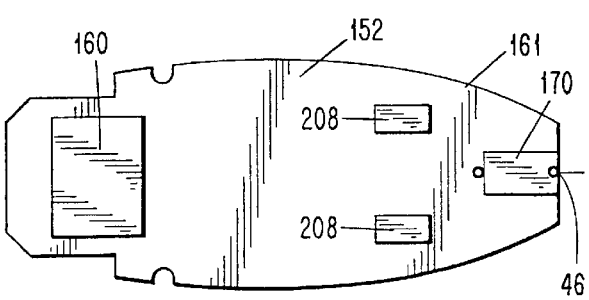
FIG. 8
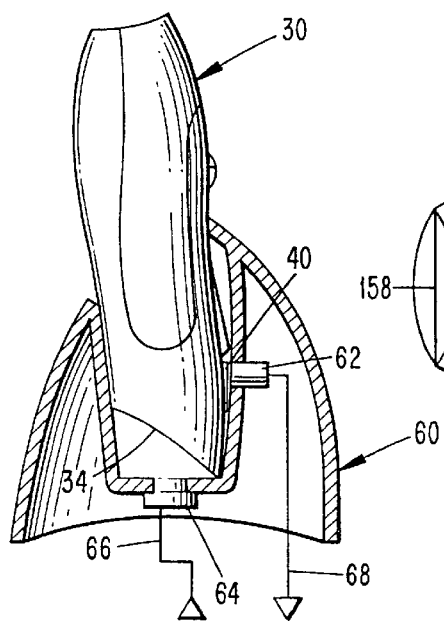
FIG. 4(b)
FIG. 7

RETAIL SALES CUSTOMER MARKETING SYSTEM WITH ELECTRONIC COUPON PROCESSING

This application is a continuation-in-part of U.S. patent application Ser. No. 10/005,957, filed Nov. 8, 2001, which claims priority to U.S. Provisional Application Serial No. 60/334,816, filed Oct. 31, 2001, which claims the benefit of provisonal application Ser. No. 60/282,892 filed Apr. 10, 2001.

BACKGROUND OF THE INVENTION

FIELD OF THE INVENTION

The present invention relates to methods and apparatus for electronic coupon delivery systems for consumer promotional purposes, including apparatus and processors for generating, printing, and authenticating coupons to be redeemed for products, especially products bearing symbols to be electro-optically read by personal, consumer hand-held readers or fixed mounted displays and auto-ID readers.

BACKGROUND AND OBJECTS

The present invention relates to retail marketing systems in which small, personal bar-code readers are used by consumers are part of their product selection and purchasing process.

Code readers are known in the prior art for reading various symbols such as bar code symbols appearing on a label or on the surfaces of an article. The bar code symbol itself is a coded pattern of indicia comprised of a series of bars of various widths spaced apart from one another to bound spaces of various widths, the bars and spaces having different light reflecting characteristics. The readers in scanning or imaging systems electro-optically transform the graphic indicia into electrical signals, which are decoded into information, typically descriptive of the article or some characteristic thereof. Such characteristics are conventionally represented in digital form and used as an input to a data processing system for applications in point-of-sale processing, inventory control and the like. Scanning systems of this general type have been disclosed, for example, in U.S. Pat. Nos. 4,251,798; 4,369,361; 4,387,297; 4,409,470; 4,760,248; 4,896,026 and 5,600,121, all of which have been assigned to the same assignee as the instant application. As disclosed in some of the above patents, such systems may employ a hand-held, portable laser scanning device held by a user, which is configured to allow the user to aim the device, and more particularly, a light beam, at a targeted symbol to be read.

The light source in a laser scanner bar code reader is typically a semiconductor laser. The use of semiconductor devices as the light source is especially desirable because of their small size, low cost and low voltage and current requirements. The laser beam is optically modified, typically by an optical assembly, to form a beam which is directed to the target. A spot of a certain size, shape, and orientation is formed on the target, which varies with the distance to the target. Normally, such spot has beam width in its smallest cross-section from one to three times the size of the minimum width between regions of different light reflectivity, i.e., the bars and spaces.

In the laser beam scanning systems known in the art, the laser light beam is directed by a lens or other optical components along the light path toward a target that includes a bar code symbol on the surface. The moving-beam scanner operates by repetitively scanning the light beam in a line, pattern or series of lines across the symbol by means of motion of a scanning component, such as the light source itself or a mirror or mirrors disposed in the path of the light beam. The scanning component may either sweep the beam spot across the symbol and trace a scan line across the pattern of the symbol, or scan the field of view of the scanner, or both.

Bar code reading systems also include a sensor or photodetector, which detects light reflected or scattered from the symbol. The photodetector or sensor is positioned in the scanner in an optical path so that it has a field of view which ensures the capture of a portion of the light which is reflected or scattered off the symbol. This light is detected and converted into an electrical signal. Electronic circuitry and software decode the electrical signal into a digital representation of the data represented by the symbol that has been scanned. For example, the analog electrical signal generated by the photodetector is converted by a digitizer into a pulse or modulated digitized signal, with the widths corresponding to the physical widths of the bars and spaces. Such a digitized signal is then decoded, based on the specific symbology used by the symbol, into a binary representation of the data encoded in the symbol, and subsequently to the information or alphanumeric characters so represented.

The decoding process of known bar code reading system usually works in the following way. The decoder receives the pulse width modulated digitized signal from the digitizer, and an algorithm, implemented in the software, attempts to decode the signal. If the start and stop characters and information between them in the scan were decoded successfully, the decoding process terminates and an indicator of a successful read (such as a green light and/or an audible beep) is provided to the user. Otherwise, the decoder receives the next scan, performs another decode attempt on that scan, and so on, until a satisfactorily decoded scan is achieved or no more scans are available.

Such a signal is then decoded according to the specific symbology into a binary representation of the data encoded in the symbol, and to the information or alphanumeric characters so represented. The decoded information may be stored or subjected to data processing.

Moving-beam laser scanners are not the only type of optical instrument capable of reading bar code symbols. Another type of bar code reader is one which incorporates detectors based on solid state imaging arrays or charge coupled device (CCD) technology. In such prior art readers the detector is typically smaller than the symbol to be read. Accordingly, image reduction is performed by an objective lens in front of the array or CCD. The symbol may be illuminated with light from a light source such as light emitting diodes (LED) in the scanning device, and each array cell is sequentially read out to determine the presence of a bar or a space. A code reading engine employing imager technology is disclosed in U.S. application Ser. No. 09/096, 578, filed Sep. 1, 1998, and assigned to applicant herein.

It is known to provide multiple actuators in hand-held optical code readers. For example, a system disclosed in U.S. Pat. No. 5,117,098, uses a multi-position trigger switch in a hand-held laser scanner. The scanner is aimed at the symbol to be scanned during a first operational state in which an aiming pattern is emitted. Once the user had aligned the scanner properly with respect to the location of the symbol, the trigger switch is actuated again to put the device into a second operational state in which the beam is scanned across the symbol in the normal scanning or reading mode, and the symbol decoded. European Patent No.

0355355 describes a combination bar code reader and EAS tag deactivator, including an embodiment with a multi-position trigger.

U.S. Pat. No. 5,600,121, assigned to applicant, discloses, inter alia, a system for reading indicia such as bar code symbols having a scanner for generating a scanning light beam directed toward a symbol to be read; a first actuator manually displaceable from a first position to a second position for producing a first light beam for aiming or positioning the reader; and a second actuator manually displaceable from a first position to a second position for initiating a scanning beam pattern for reading the symbol. The actuators are independently operative of each other. A detector receives the reflected light from the symbol and produces electrical signals corresponding to data represented by the symbol. A graphical user interface simplifies system control functions.

The known readers and scanners are generally employed to identify a product involved in a sales transaction. Once the product has been identified, its price can be retrieved from a database in order to complete the sales transaction. Many industries, especially food retailers, have offered redeemable coupons as sales promotions to entitle the redeemers to discounts or refunds from the prices of the products being purchased. These coupons have typically been printed on paper and distributed in newspapers, magazines, mass mailings and like publications. Sometimes, they are simply made available in a retail store for a shopper to pick up the paper coupon and present it to a check-out clerk for redemption.

Recently, coupons have been made available on the Internet due to the relatively low cost of on-line distribution of coupons, as well as the capability of tracking the activity of users on the Internet and targeting the users with coupons that they are most likely to use. Such on-line coupons have to be printed out on the printer of each user and thereupon presented to a check-out clerk in the same manner as the paper coupons that were traditionally clipped from publications.

However, on-line coupons have inherent risks and are susceptible to duplication, multiple use, misuse and fraud. Some coupons may be less readable and scannable depending on the quality of the consumer's printer as compared to a professionally printed coupon. Many consumers' printers print text in black and white, rather than in color, and many retailers are trained not to accept black and white coupons because of the concern that an authentic professionally printed, color coupon has been copied on a copy machine. Also, an on-line or electronic coupon may be easily fraudulently altered before it is printed, thereby decreasing the viability of on-line or Internet coupons.

There is a need, therefore for retail marketing systems in which a consumer has a bar code reader, which is simply and inexpensively fabricated, which is easy to use, and which provides user access and feedback for a broad range of finctions, including preparing shopping lists, having access to electronic coupons, enables the printing of paper coupons, etc.

SUMMARY OF THE INVENTION

In keeping with these objects and others which will become apparent hereinafter, one feature of this invention resides, briefly stated, in a method for using a bar code reader to facilitate a sales transaction using a paper coupon by providing a scanner to a consumer; scanning bar code symbols on products to be purchased by said consumer to generate a shopping list; and transferring the shopping list to a coupon information processing unit. The processing unit processes the shopping list by the processing unit to determine the set of coupons for specific products to provide to the consumer; and prints a set of paper coupons for the consumer's use in purchasing such products.

The present invention further provides a sales incentive system including a portable handheld optical code reader for use by a consumer for scanning bar code symbols corresponding to product items to be purchased, including a memory for storing symbol data of items scanned by the reader, and a computer for receiving the stored data associated with the scanned items from the memory of the reader, and selectively generating coupon information based upon sales offers for specific products currently available based upon an analysis of the stored data by the computer.

A printer may be further provided coupled to the computer for printing at the consumer's location a set of coupons corresponding to the coupon information transferred from the computer to the consumer's location.

In anther embodiment, the invention provides a cellular telephone with a bar code reader and position locating capability, e.g. for determining the specific location of the telephone with respect to the aisles or other positioned indicators in a retail establishment, such as a supermarket, department store, mall, etc.

The flow-chart of FIG. 15, the present invention also provides a method of reading a bar code on a target by taking a picture of the target including the bar code symbol with a digital camera by the user; and processing the image into a digital data packet including the bar code image data; and transferring the digital data packet over a computer network to a remote server. At the server, the server performs a decode on the bar code image data and an acknowledgement of a decode is sent to the user over the network. The decoded data may be stored at the server or sent to the user, or to another user designated destination.

The electronic coupon can be read and stored into the memory of the reader by various means. For example, a printed symbol corresponding to the electronic coupon can be read by the reader and stored as coupon data in the memory. Digital coupon data corresponding to the electronic coupon can be downloaded from a server on the Internet, or from a host computer at the site of the sales transaction. Coupon data corresponding to the electronic coupon can also be manually entered by keyboard entry. The coupon data stored in the memory of the reader is downloaded into a memory of a transaction system, typically a host computer located remotely from the reader. The downloading is preferably performed by wireless transmission at radio frequency.

In use, a bar code symbol identifying the product to be purchased is read by the reader, and the identifying data is downloaded to the memory of the transaction system. The coupon data is then electronically matched with the identifying data at the transaction system. Once a match is made, the coupon is redeemed, and the adjustment to the purchase price is transmitted, preferably by wireless transmission, to the transaction site for the economic benefit of the consumer in order to complete the sales transaction.

Preferably, the coupon data includes a time stamp and an expiration date for the coupon. It is also desired if a customer identifier and/or a reader identifier is stored in the reader memory and downloaded to the memory of the transaction system, together with the downloaded coupon data and product identifying data. The electronic coupon, when printed out, has bar code symbols preferably encoded in the UCC/EAN-128 coupon extended code format, in which a second bar code symbol is printed to the right of the standard bar code symbol that identifies the product. The second symbol contains offer codes, household identification codes and expiration dates.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 4a and 4b are cross-sectional side views of two cradles employed in preferred embodiments of the present invention;

FIGS. 7 and 8 are, respectively, top and bottom views of a circuit board assembly used in a preferred embodiment of the present invention;

FIG. 9 is a top view of a bottom housing half of an optical code reader of a preferred embodiment of the present invention, in partial cut away;

DETAILED DESCRIPTION OF PREFERRED EMBODIMENTS

Figure 1:
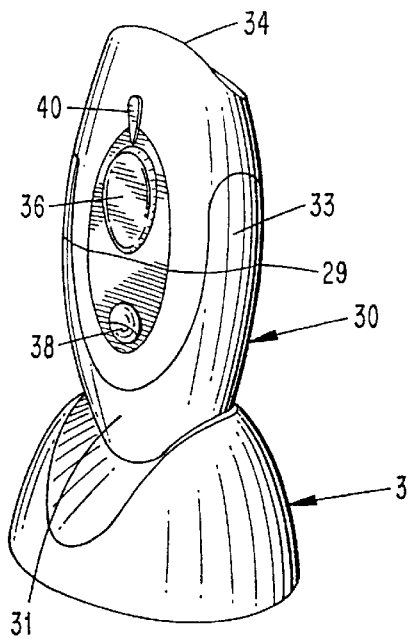
FIG. 1 is a pictorial view of an optical code reader and cradle in accordance with a preferred embodiment of the present invention.
Figure 2:
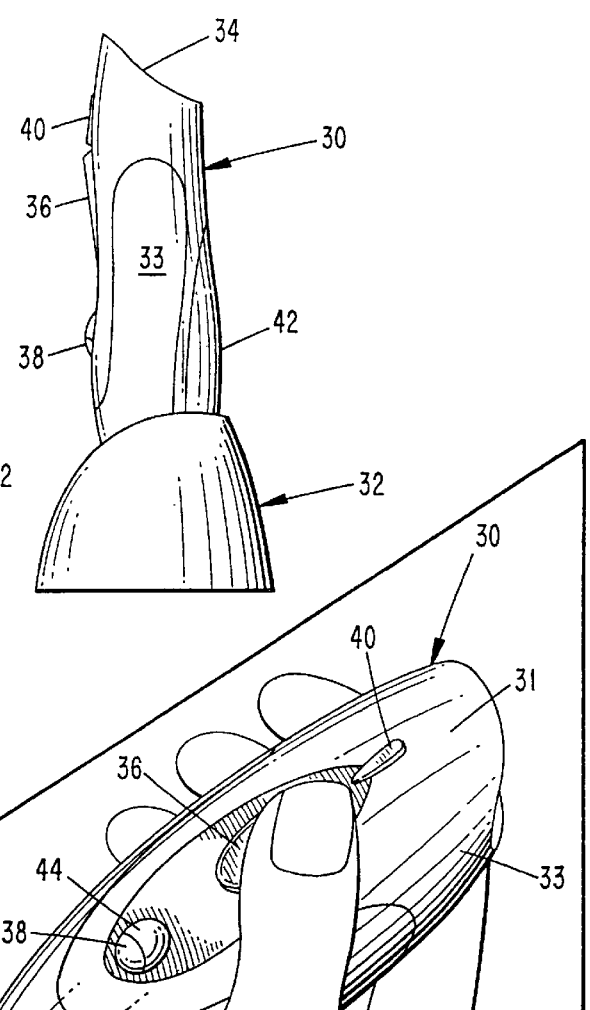
FIG. 2 is a side view of the code reader and cradle of FIG. 1.
Figure 3:
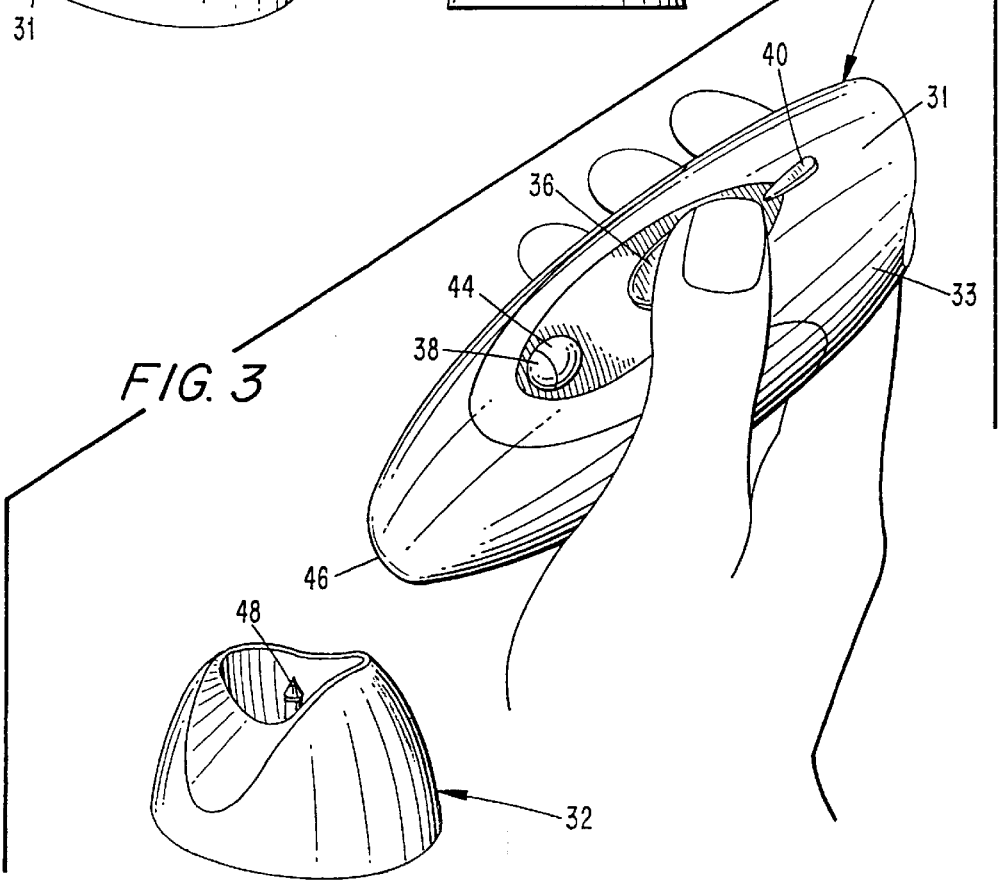
FIG. 3 is a pictorial view of the optical code reader of FIG. 1 removed from its cradle and held in the palm of the hand of a user.

Many aspects of the present invention are contained in or useable in a preferred embodiment of the present invention whose external construction and appearance are depicted in FIGS. 1–3.

This portable handheld optical code reader 30 is of a generally elongate bar shape equal to or less than four and three quarters inches in length having generally opposing upper and lower broad faces 31 and shallow side faces 33. The circumference of the code reader at its thickest portion 29 is about five inches, such that it fits comfortably in the average human hand as shown in FIG. 3. The front end is truncated to form a face to accommodate a scanner exit window 34. The rear end 35 is generally tapered and is adapted to nest in a cradle 32. Overall the reader is shaped generally elliptically when viewed from the angles shown in FIGS. 1 and 3.

It will be understood that many aspects of the present invention described below may be adapted for use in this as well as other hand-held or stationary optical code readers.

I. Housing, Actuators and Ergonomics of Code Reader Embodiments

FIGS. 1 and 2 are, respectively, pictorial and side views of the optical code reader 30 and cradle 32 configured in accordance with a preferred embodiment of the present invention. The code reader 30 is generally elliptical in shape with slightly rounded upper and lower ends as viewed in FIGS. 1 and 3. FIG. 2 is a right side view of the code reader. The left side view is a mirror image of FIG. 2.

A scanner exit window 34 is located at one end of the reader (the top end in FIGS. 1 and 3). The actuators comprise a scan button 36 and a delete button 38. Feedback to the user is provided by a three-color LED display visible through LED window 40. A removable battery cover 42 is located on the opposite side of the reader from the buttons and LED window.

FIG. 3 is a pictorial view of the optical code reader 30 of FIGS. 1 and 2, shown removed from the cradle 32 and held in the hand of the user. The FIG. illustrates, among other things, the approximate size of the code reader. The FIG. also shows how the code reader fits in one hand, where it can be easily and accurately aimed. The scan button 36 may be pressed with the thumb to initiate scanning. Access to the delete button 38 is partially obstructed by a raised casing area 44, which reduces the possibility of inadvertent actuation of the delete button 38.

II. Cradle, and Electrical and Optical Interfaces

With continued reference to FIG. 3, the code reader 30 also may include a communication connector socket 46 at the rear end of the device into which a plug 48 may be inserted. The plug and socket may be used to electronically transfer collected optical code data to a personal computer or other suitable data handling terminal.

In a more preferred embodiment the plug 48 is a miniature stereo phone plug located in the cradle 32. The structure of such a cradle and plug is shown in greater detail in the cross-sectional view of FIG. 4(a). The structure may be easily fabricated from a pre-made miniature phone plug and cable assembly 50. The plug portion 52 may have a molded casing 54 which snaps into and out of corresponding walls 56 of the cradle 32. This construction has the advantage that a stock cable can be used for communication either by itself or in conjunction with the cradle 32. A switch in the socket 46 may be used to detect insertion of the plug and to disable the laser scanner when the plug is inserted in the code reader.

An optional optical interface may also be conveniently provided using a suitable cradle or docking station. The structure of such a cradle 60 is shown in FIG. 4(b) in cross-section. A code reader 30 of a preferred embodiment of the present invention is shown inserted in the cradle 60. When so inserted the LED display window 40 of the reader is located adjacent to a photo detector 62. A light emitting element or LED 64 is located on a optical path of the code reader 30, to project an optical signal to the code reader 30 through the scanner exit window 34.

In operation an RS 232 output port of the reader 30 may be electrically connected to the LED display and to a photo detector employed in the scanning module of the reader. Data may be input into the reader 30 by means of the LED 64 as indicated by signal line 66. Light produced by the LED 64 is projected along an optical input path which may be collinear with an optical input path of the scanner during normal scanning operations. Detection input data may be digitized and applied to a data receptor line of a microcontroller of the reader. Advantageously, the input data may be transmitted at about a 9600 baud rate, which approximates the frequency band associated with light signals produced when a bar code is scanned. Thus, the input electronics of the reader may be optimized to one frequency band common to both bar code scanning and optical interface signal input.

Data may be optically outputted from the code reader 30 by employing the display LED. Light produced by a display LED for example a red display LED may pass through LED display window 40 and be detected by the photo detector 62, where it is converted to a electrical signal and passed to a host or terminal as indicated by signal line 68.

It will be understood from the foregoing that the reader 30 may be provided with two modes of connectivity: electrical and optical. The electrical communication mode may be implemented at lower cost and may be more appropriate for home use, especially where the reader host is a home personal computer. The optical cradle requires electrical power for the LED 64. It may be more appropriate in heavy use environments such as a centralized host Kiosk in a store which exchanges data with many code readers and which is always ready to accept data from the code readers it services. It will be understood that while th& optical interface cradle or dock may be more expensive to fabricate, it is less susceptible to wear and tear caused by, for example, electrical contact degradation.

Further alternative types of cradles or docks may employ either of the above described electrical or optical interfaces, but contain further circuitry permitting direct access to and communication with telephone, cable or internet lines.

III. Internal Construction

Figure 5:
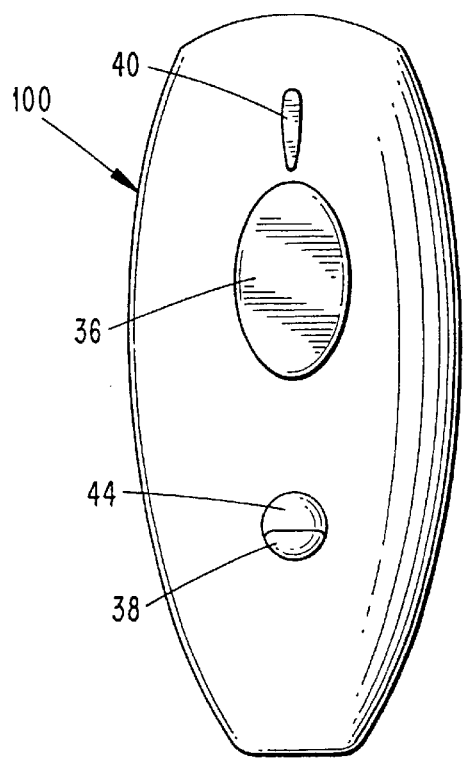
FIGS. 5 and 6 are, respectively, a top view and a bottom view of a top housing half of an optical code reader of a preferred embodiment of the present invention.
Figure 6:
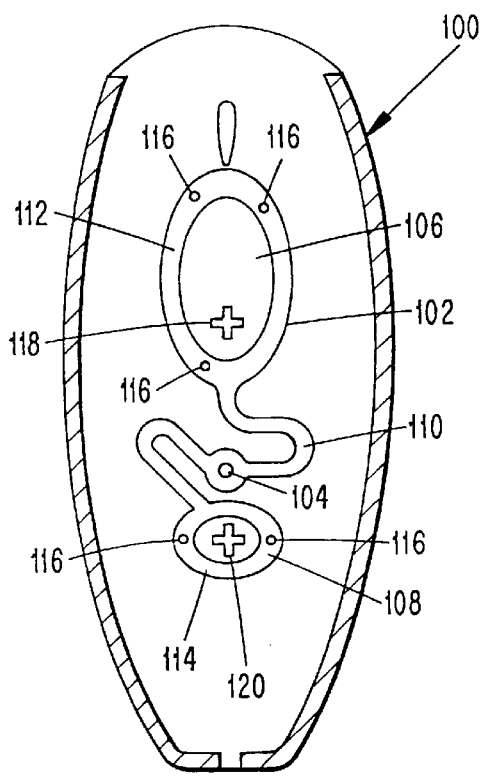

The internal construction of the optical code reader 30 of FIGS. 1 through 3 will now be described. The top housing half 100 of the optical code reader is shown in plan view in FIG. 5, wherein like features of the embodiment of the preceding figures are identified by the same numerals. The underside of the top housing half 100 is shown in plan view in FIG. 6. A flexible button pad member 102 is attached to the housing half 100 at 104. The pad assembly 102 includes a scan button portion 106 and a delete button portion 108 integrally connected to each other by the elongated, flexible, serpentine portion 110. Flange portion 112 and 114 of the button portions are normally held against the housing half 100 by internal protruding posts 116 which rest on an underlying circuit board assembly 152 depicted in FIGS. 7 and 8. Activation pillars 118 and 120 are integrally formed in their respective button portions 106 and 108 respectively.

In operation, when the scan button 106 is depressed, it triggers an electrical switch 150 located on an underlying circuit board assembly 152 shown in FIG. 7. Likewise, when the delete button 108 is depressed, it triggers an electrical switch 154, also located on the circuit board assembly 152.

The circuit board assembly 152 will now be described in greater detail in connection with FIGS. 7 and 8. The circuit board assembly is shown in FIG. 7 positioned in a lower housing half 156 and held in position by post 157 and pressure tabs 159, both carried by the lower housing half 156. The scanner exit window is located at 158. A scanner module or engine 160 is located on the underside of the circuit board assembly 152 and directs a laser scanning beam outward through the exit window at 158.

A scanner module useful in the code reader of the present invention is constructed in the shape of a rectangular solid and known as an SE 900 scanner module. Such a scanner module is disclosed in U.S. patent application Ser. No. 09/275,858, filed Mar. 24, 1999, which is hereby incorporated by reference. Alternatively, the scanner module may be a "scanner on a chip" such as disclosed in U.S. patent application Ser. No. 09/209,243 filed Dec. 10, 1998, now U.S. Pat. No. 6,021,947, which is hereby incorporated by reference. As a further alternate the scanner module may be of a cylindrical type as discussed below in connection with FIG. 13. Finally, the optical detection may be performed by a code reading engine employing imager technology such as disclosed in U.S. patent application Ser. No. 09/096,578, filed Sep. 1, 1998, and hereby incorporated by reference.

The circuit board assembly 152 includes a single main circuit board 161 on which electrical components are mounted, including switches 150 and 154, display LED 162, micro processor chip 164, memory chip 166 and I/O communications chip 168. Advantageously, the display LED is a conventional bi-color LED (red and green) capable of producing red, green and yellow light (yellow light being produced by combining red and green light). A communication connector socket 170 and the scanner module may be mounted on the underside of the circuit board 161 as shown in FIG. 8.

FIG. 9 illustrates the lower housing half of the optical code reader, with an upper wall of a battery compartment 180 cut away to reveal the location of the batteries 182 and 184, battery compartment side walls and spring contacts. In a preferred embodiment the batteries are AAA type batteries.

An outer side wall 186 of the battery compartment forms a side wall which encircles the batteries. Inner end walls 188 and 190 are configured with small apertures 192 slightly larger than the protruding contacts 194 (positive terminals) employed on standard 1.5 volt batteries. In operation the contacts 194 penetrate in the apertures 192 and make electrical contact with conductive spiral helical springs 196 and 198.

The opposite ends (negative terminals) 199 of the batteries are formed substantially flat and rest against helical springs 200 and 202 which protrude through larger apertures 204 in the inner side walls 188 and 190.

Spiral helical springs 196 and 200 are electrically connected together. Spiral helical springs 198 and 202 end in spring loaded arms 206 and 207, respectively. When the circuit board assembly 152 is positioned in the lower housing half 156, the spring arms maintain themselves in pressure contact with conductive lands 208 on the underside of the circuit board 161 shown in FIG. 8. Thereby, the batteries are connected in series to provide an appropriate voltage (typically 3V DC) to the circuit elements of the optical code reader.

It is conventional to include at least one diode in the power supply circuit of hand held battery powered scanners and other battery powered devices to prevent damage to the circuitry if a battery is inadvertently installed backwards (i.e., with its positive and negative terminals reversed). The need for such measures is obviated by the structures of FIG. 9. It will be readily understood that the contact spring for the positive battery terminal is accessible only if the protruding terminal 194 of the battery is inserted into the small aperture 192. These same contact springs are inaccessible to the wide, flat negative terminal of the battery. Accordingly, if a battery is inserted backwards, the circuit is not completed.

IV. Optical/Electronic Systems

Figure 10:
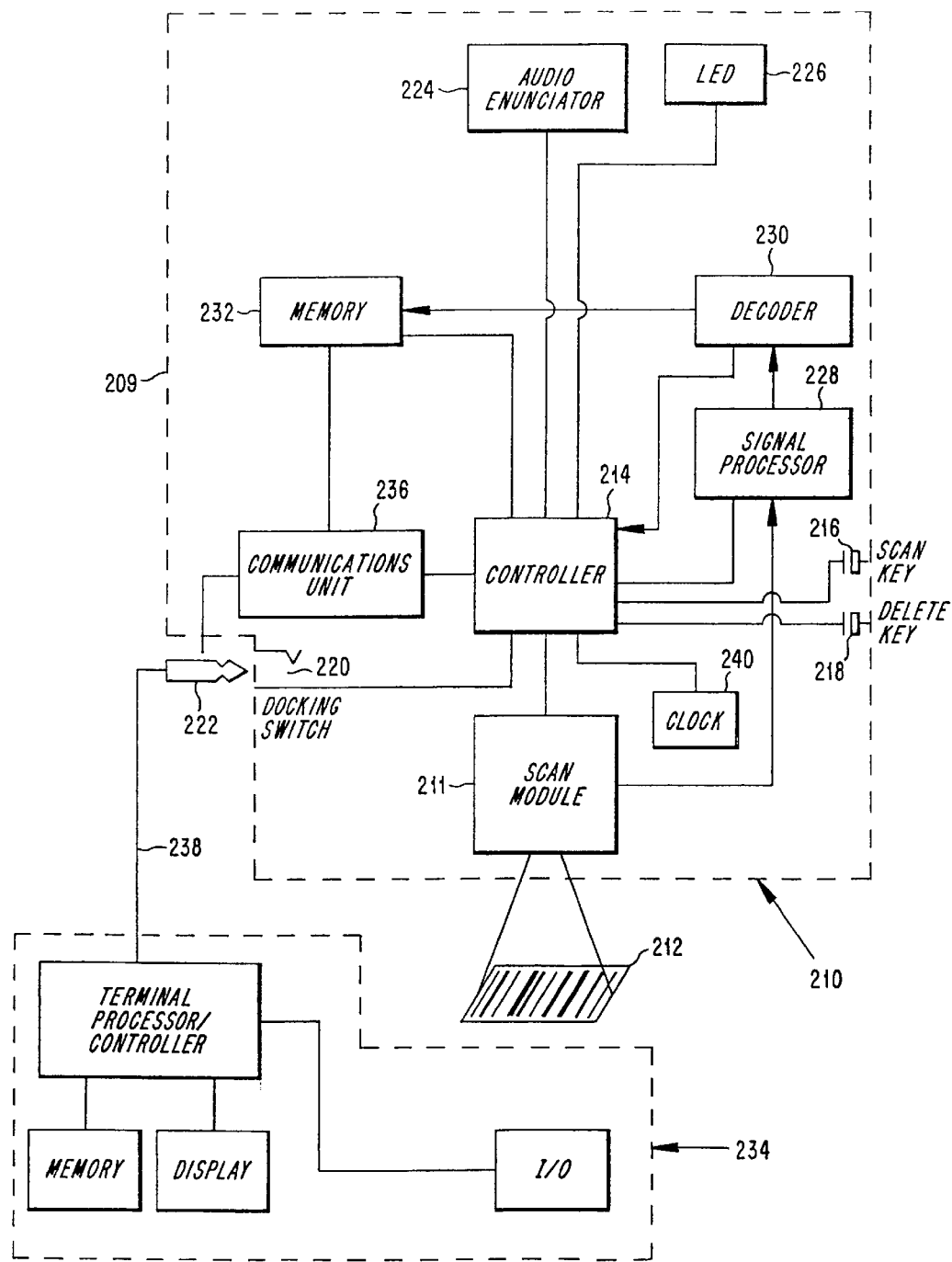
FIG. 10 is a schematic block diagram illustrating various electronic sub-systems usable in data collection systems in accordance with aspects of the present invention.

FIG. 10 is a schematic block diagram of a preferred embodiment of an optical code reading system of the present invention. Portions of the systems of FIG. 10 are described in U.S. Pat. No. 5,801,371, the contents of which are hereby incorporated by reference herein. Generally speaking, the system elements enclosed by the dotted line 209 may be housed in a hand-held optical code reader 210, while the systems outside line 209 may be resident in an external computer or terminal which communicates with the reader through a communications link such as described above.

The hand-held code reader 210 includes an optical code reading module 211 which may be an imager or a laser scan module of conventional construction or of the type described in detail below. The bar code being read is indicated at 212.

The module is controlled by a controller 214, which may be implemented in a microprocessor. The controller receives at least three user signals: from the scan key switch 216; from the delete key switch 218 and from the docking switch 220. The keys may be actuated by the fingers of the user. The docking switch may be actuated by insertion of a communication plug 222 into the docking switch.

The optical code reader 210 provides feedback directly to the user in at least two ways: through audible signals produced by one or more audio enunciators 224 and through visual signals produced by one or more light emitting diodes 226. In a preferred embodiment, the code reader provides audio feedback in the form of short or long beeps of two different frequency and warble beeps. Visual feedback may include continuous (solid) or flashing red, amber and/or green light signals from the LED. The audio enunciator(s) and LED(s) are operated in response to the controller 214. Preferred techniques for providing the user feedback are described below.

Signals from the module 211 may be processed in signal processor 228 and decoded by decoder 230. Decoded signals may be provided for storage in the memory 232 which may have, for example, a capacity to store information of up to 500 scanned items (UPC codes). Information concerning coupons (discussed below) may preferably be stored in a separate memory or a distinct section of an existing memory. This segregation reflects the fact that coupon data may be stored for the duration of multiple scanning or shopping sessions until used. Information in the memory or memories may be communicated to an external terminal 234 through communications unit 236, the plug 222, and cable 238.

A clock 240 may be included in the circuitry of the code reader. The clock may be employed, for example, to periodically awaken the code reader at scheduled times or intervals for data downloading. The clock may also be connected to a display (not shown) so that the code reader can be used as a timepiece.

V. Host Terminal Implementations and Uses for the Code Reader

With continuing reference to FIG. 10, the optical code reader 210 may communicate with the terminal 234 in the manner described above. The type of terminal and communication used with the code reader will depend on the use environment for the code reader. Several examples will now be provided.

It will be understood that versions of the optical code readers described may be very inexpensively fabricated. So much so that it becomes feasible to sell the unit to store customers for use in tallying their purchases in store and/or for use at home in preparing shopping lists. As an alternate the code reader could be leased to the customer. The rental can be based on time (for example a monthly rental fee). More preferably, the rental may be based on the number of decodes performed by the customer with the unit. The numbers of decodes or accumulated rental charges can be counted by software and hardware in the code reader or in a store terminal with which the code reader periodically communicates. In this system, the rental is based on use and can be conveniently tallied and automatically collected when the code reader communicates with a system terminal.

In one preferred embodiment, the system terminal may be a personal computer. Through the appropriate selection of the communication unit 236 and the cabling, the reader may communicate directly with a serial port of the personal computer. The code reader and cradle may be provided as an inexpensive preferred component. Applications software installed on the computer enables the upload of a data from the code reader to the computer. Such software may be provided to the computer, for example, on magnetic media, CDs or over the Internet.

With appropriate applications software the PC can recognize when the code reader is docked in the cradle. The PC can, for example, download information from the docked reader at a predetermined time. Docking may automatically disable the scanning mode of the code reader.

In other preferred embodiments, the system terminal may be a highly capable point of sale terminal. The point of sale terminal may bring together inputs and data from a variety of sources other than the hand held optical code readers of customers and employees. Such sources include a pen tablet, a fingerprint recognition pad, a magnetic strip reader (e.g., for credit card verification), a smart card reader (with or without contacts), a speech recognition system, a global positioning system (GPS), an RF transceiver, removable memory cards or discs, analog I/O, IrDA data or an encryption/decryption system. Outputs of the terminal may include a display, a speaker system and a printer.

In a shopping environment, the system may provide additional functions such as aisle sorting the customer's shopping list or providing price ranges for items on the list. Such information can be obtained by connecting the code reader to the merchants' data server to obtain product, price and/or location data on the items which the merchant has for sale.

Advantageously, a portion of the internal memory of the code reader can be allocated to a variety of applications other than storing information on scanned items. For example, 128 bytes of memory could be allocated to applications memory. Among the data which could be stored in the applications memory are the customer's name, the customer's telephone number, the identity of the issuing store or owner of the scanner and the telephone number of the store. The customer and the store identity and telephone numbers provide convenient means by which a host terminal can greet and identify the user of the code reader and indicate and access the associated issuer or store. Alternatively or in addition, each code reader may be provided with a memory of its unique serial number, which a host terminal may use to look up, for example, the identity of the customer or the issuing store. Such identification information may be used in a key and lock system which enables only authorized customers to use the scanner at authorized stores or for authorized purchases.

The allocated applications memory may also be employed to store transaction related data. For example, the memory may store the number of decodes for billing as described above, or keep a store-by-store log of the total dollar purchases (for example for tallying up volume or patronage discounts).

Other memory internal to the code reader may be used for storing coupon data. For example, an electronic coupon can be uploaded by scanning the bar code of a printed coupon or by electronically downloading the coupon from a web site or by simply inputting the coupon into the code reader when the code reader is connected to a merchant host terminal. For example, memory for 200 or 300 coupons might be provided including coupon values, expiration dates and validity data.

An example of the operation of a coupon redemption process is as follows. A customer could load electronic coupons into the reader in one or more of the ways described above. The customer could scan purchased items with the code reader. Data concerning both the purchased item and the electronic coupon could be downloaded by a merchant host terminal, which would pair valid coupons with corresponding purchases. The host terminal would discard expired coupons, delete used coupons, and return unexpired, unused coupons to the memory of the code reader.

In other preferred embodiments, a method is provided for using the bar code reader to facilitate a transaction between a buyer and at least one of a plurality of merchants or sellers of a product or service utilizing a computer network. In accordance with that method, a product or service identification derived from scanning a bar code symbol is in put into the bar code reader. A customer identifier is provided in the bar code reader (for example, a unique serial number permanently stored in the bar code reader). The bar code reader is manually associated with a transaction terminal linked to a computer network by, for example, docking the code reader in a host terminal. The potential suppliers on the network capable of providing the product or service are determined. An inquiry is transmitted over the network to the plurality of sellers to determine the price and availability of the product or service. In some environments such as stock transactions, price and availability change rapidly and, it will be understood that, sales transactions can be performed in a timely way with the present method. Also, the sellers can use the customer identity to determine whether and under what terms to complete the sale. Responses are received in the host terminal from one or more sellers including a sales offer; an acceptance is transmitted responsive to one of said sale offers; and a payment is provided to the seller by using a payment identifier transmitted by the transaction terminal. In this way the network is accessed by the bar code reader to facilitate sales transactions.

In other preferred embodiments, a customized scanner is employed which carries an identifier of a particular supplier or distributor of a product or service, e.g., a sponsoring merchant. The sponsoring merchant may itself distribute its bar code readers to customers or potential customers. In this case the bar code reader may be used to facilitate transactions between a customer and the particular supplier to whom an inquiry is transmitted over a computer network to determine the current price and availability of a product or service from the supplier. The customer may receive a response from the supplier over the computer network including a current price. The customer may then transmit an acceptance identifier to the supplier over the computer network.

In further, preferred embodiments, the code reader is integrated with a wireless transceiver unit to facilitate a transaction between a buyer and a seller. For example bar code scanners of the present invention may be integrated into a cellular telephone. In such a case, the need to dock the scanner with a host terminal or home personal computer to upload or download data may be obviated. The user of such a system may input an order or bid request and directly transmit the order or bid request to a supplier. It will be understood that a customer or supplier identifier in the unit may be used for the purposes described above, in order, for example to direct customers to a sponsoring merchant, or to identify the customer to validate use, payment or acceptance.

VI. Actuator States, Timing, Indicators and Functionality.

Figure 11:
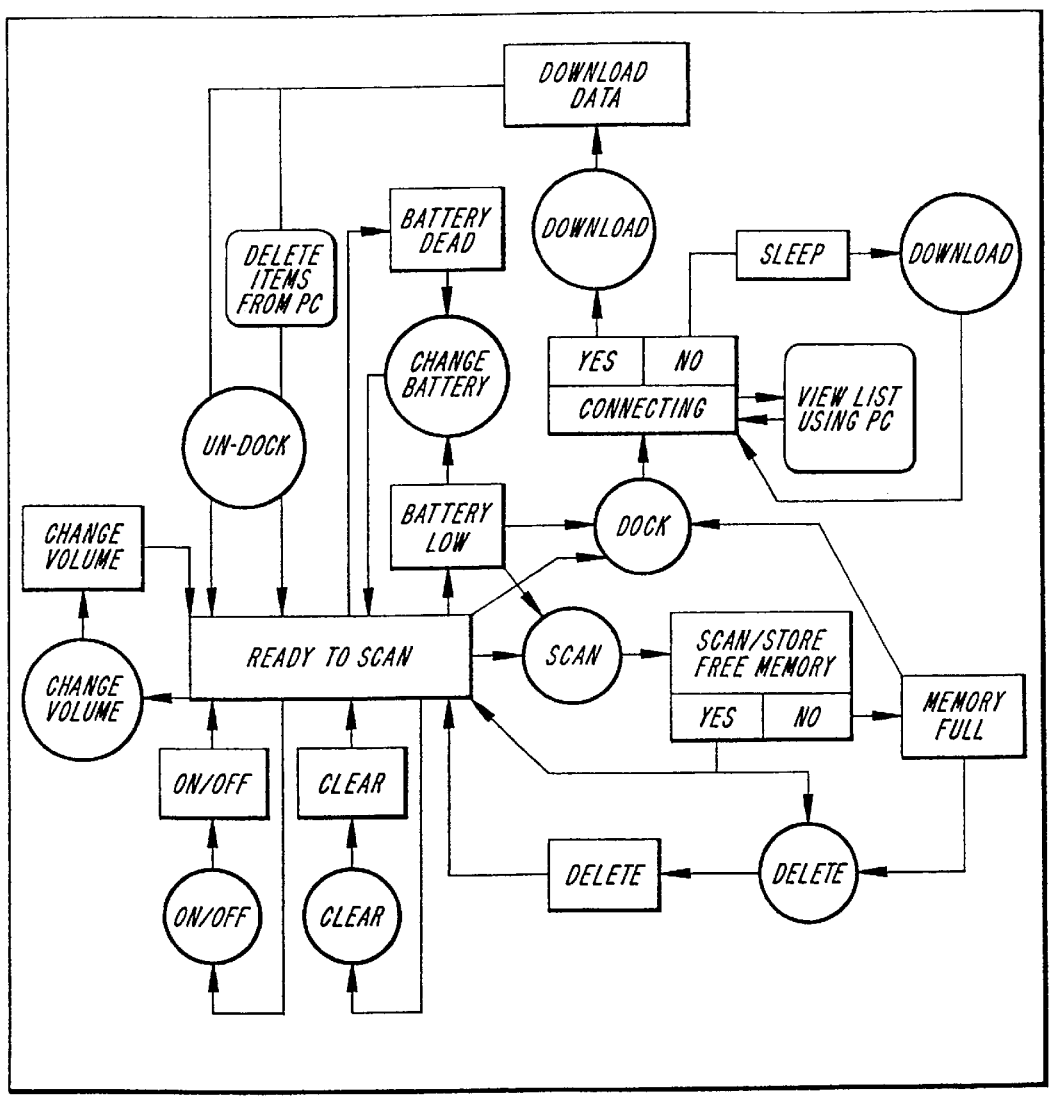
FIG. 11 is a state transition diagram of a preferred embodiment of the present invention.

FIG. 11 is a state transition diagram, illustrating the coordination of various functions of the optical codes reader/ PC system of a preferred embodiment of the present invention. In the diagram various code reader operation such as scan, dock and delete are represented as circles. System states are represented as squares. The PC operation of viewing a list of stored items is shown in a rounded square accessible from the "dock" operation. The diagram, indicates, among other things, the various options or responses to the condition of full memory or low battery.

As noted above, the code reader of a preferred embodiment has two user actuated keys and a number of audio and visual feedback capabilities. These inputs and outputs are coordinated with at least five basic functions: Scan (e.g., item input), deletion of.item, clearing memory, communicating with a host terminal and actuating a lock out. The relationship of the user action to function performed and audible/visual feedback are given in the following Table I.

TABLE I

Code Reader Functions — User Action/Feedback

| Function Performed | User Action | LED Feedback (Green, Red, Amber) | Beeper Feedback | Other |
|---|---|---|---|---|
| Scan | | | | |
| Item bar code | Press & hold scan key | Flashing green → solid green | Short beep, freq1 | Laser |
| Valid param bar code | | Flashing green → solid green | 2 short beeps, freq1 | Laser |
| Invalid param bar code | | Flashing green → solid red | 3 short beeps, freq1 | Laser |

TABLE I-continued

Code Reader Functions — User Action/Feedback

| Function Performed | User Action | LED Feedback (Green, Red, Amber) | Beeper Feedback | Other |
|---|---|---|---|---|
| Delete | | | | |
| (When enabled) | | | | |
| Item barcode | Press & hold delete key | Flashing amber → solid amber | Short beep, freq2 | Laser |
| Item doesn't exist | | Flashing amber → solid red | Warble beep | Laser |
| Param bar code | | Flashing amber → solid red | 3 short beeps | Laser |
| (Delete disabled-Clear All enabled) | Press & hold delete key | Flashing amber Fall through to Clear All | None | Laser |
| (Delete & Clear All disabled) | Press & hold delete key | None | None | None |
| Clear All | | | | |
| (When enabled) | Press & hold delete key 3 sec past scan time | Flashing amber → solid amber | Long beep, freq2 | Laser on for scan time off |
| (When disabled) | Hold delete key past scan time | None | None | None |
| Communication | | | | |
| Successful (Powerdown recv'd) | Unit docked and awakened by Host or push of scan or delete key | Flashing green → solid green | Short beep on host connect, then long beep on power down | None |
| Unsuccessful | | Flashing green → solid red | | None |
| Child Lock Toggle | | | | |
| (When enabled) | Press & hold both scan and delete keys 1 sec | None | Hi low, Hi low | None |

Under the "Scan" function, three possibilities and their user feedbacks are noted in Table I: scan of an item bar code, scan of a valid param bar code and scan of an invalid param bar code. Param bar codes are bar codes which change the behavior or basic functionality of the code reader, rather than indicating the identity of a particular item in the manner of a UPC code. As such the param bar code may be used to effect or toggle higher level operations such as for example converting the code reader to a laser pointer.

Under the "Delete" function, three possibilities are noted in Table I: scan of an item bar code previously entered in memory, scan of a bar code not in memory, and scan of a param bar code. When the delete function is enabled, the scanning of an item bar code previously entered in memory, deletes one of the item from memory. Repeated use of this delete function may be used to decrement the quantity field in memory for the item, one unit at a time. Scanning of the bar code of an item whose current count in memory is zero while pressing and holding the delete key, provides the user a feedback signal of the inability to delete. Param bar codes may be scanned to enable or disable the Delete function and Clear All function (described below).

Under the Clear All function, two possibilities are noted in Table I: when Clear All function is enabled or when Clear All function is disabled. When the Clear All function is enabled, pressing and holding the delete key while scanning an item bar code and holding the delete key 3 seconds past the scan time, deletes all of the items memory (reduces the item count to zero) and provides the indicated user feedbacks. In this way the memory can be cleared of all of an item, and, if desired, one or more of the item may then be reentered by using the Scan function for the item bar code. Advantageously, the default setting of the code reader is one in which both the Clear All and Delete functions are enabled.

As shown in Table I a Lock Toggle is provided in the code reader. The system may be employed to shut out unauthorized use to protect data and to prevent inadvertent eye exposure to laser light. As indicated in Table I the function is performed by pressing and holding both the scan and delete keys for one second. Because of the location of the two keys and the location of the blocking ridge 44 around the delete key, accidental toggling of the lock is minimized.

Figure 12:
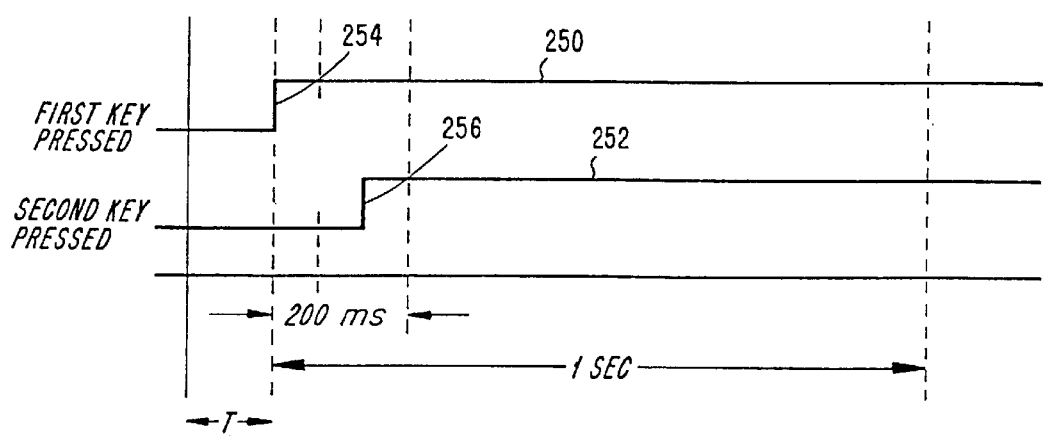
FIG. 12 is a timing diagram for the lock toggle function of a preferred embodiment of the present invention.

FIG. 12 is a switch timing diagram for the Lock Toggle function. In the example, the state of a first key pressed (the scan or delete key) is indicated by line 250. The state of the other key is indicated by line 252. A delay of T occurs during which the unit powers up and recognized the first key press at 254. An additional interval of up to 200 milliseconds is provided for pressing of the other key to toggle the lock out function. If the second key is pressed within that interval (as it is at 256) and if both keys remain depressed fro the remainder of the 1 second interval, the lock is toggled. The requirement that actuation of both keys be detected within the 200 millisecond period tends to prevent lock out toggling except in situations where the user intended to simultaneously press both buttons.

The code reader is also capable of communicating certain special conditions such as MEMORY LOW (reader memory nearly filled to capacity), MEMORY FULL, BATTERY LOW, LOCK ENABLED AND ON, and UNEXPECTED FAILURE. (The BATTERY DEAD condition is implicitly communicated because the system ceases to respond altogether when the battery is dead). The relationship of user actions, the special conditions, and the audible/visible feedback are given in the following Table II.

TABLE II

Code Reader Functions-User Action/Feedback
Special Cases

| Special Condition | User Action | LED Feedback (Green, Red, Amber) | Beeper Feedback | Other |
|---|---|---|---|---|
| Memory Low | | | | |
| Scan Item or param bar codes | Press & hold scan key | Flashing red → Normal operation | Normal operation | Laser |
| Delete/Clear All | Press & hold delete key | Normal operation | Normal operation | Laser |
| Memory Full | | | | |
| Scan Any bar code | Press & hold scan key | Solid red | Long beeps for 5 sec or until scan released | None |
| Delete/Clear All | Press & hold delete key | Normal operation | Normal operation | Laser |
| Battery Low Indication (When enabled) | | | | |
| Scan | | | | |
| Item & param bar codes | Press & hold scan key | Solid red → normal operation | Normal operation | Laser |
| Delete | | | | |
| Item & param bar codes | Press & hold delete key | Solid red → normal operation | Normal operation | Laser |
| Clear All | Press & hold delete key 3 sec past scan time | Solid red → solid amber | Long beep, freq2 | Laser on for scan time then off |
| Lock | | | | |
| (Enabled & ON) | scan/delete/dock | Rapidly flashing red | None | None |
| Unexpected Failure | scan/delete/dock | Flash red, green and amber for 5 sec (Service Call) | None | None |
| Battery Dead | scan/delete/dock | None | None | None |

It will understood that the code reader of the above-described embodiments in capable of performing its many functions and provide user feedback without the need of an on board display screen, thus reducing the cost and complexity of the code reader.

VI. Opto-mechanical Layout of Cylindrical Module Embodiment

Figure 13:
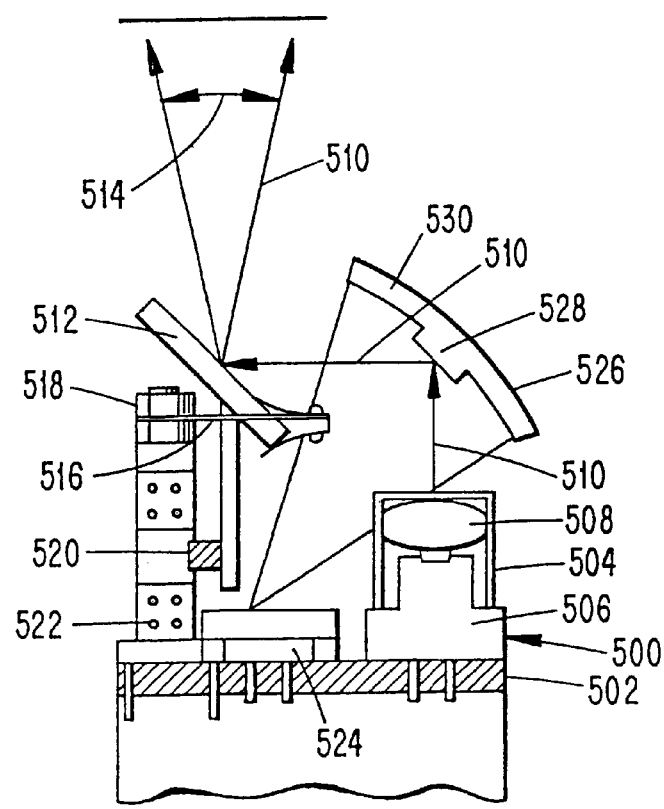
FIG. 13 is a side cross-sectional view of a laser scan module used in a preferred embodiment of the present invention.
Figure 13:
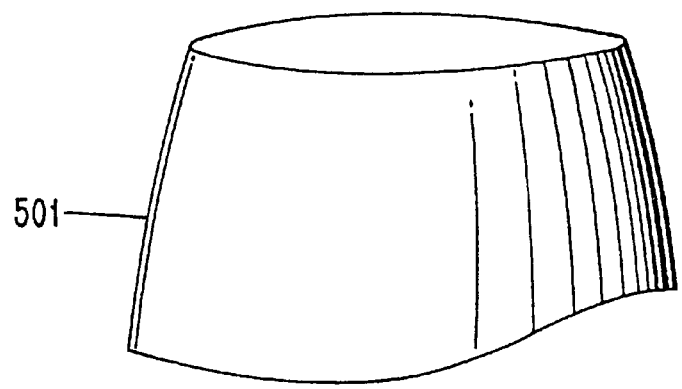

FIG. 13 illustrates an embodiment of a laser scan module for use in generally cylindrical housings. The module of FIG. 13 employs a mirror mounted on a leaf spring. Alternative embodiments may use spiral tape springs which permit the mirror to pivot about a shaft about which the spiral tape spring is wrapped.

In FIG. 13, the laser scan module 500, includes a generally circular planar base 502. It is adapted to be housed in a generally cylindrical housing such as that indicated at 501. Alternatively the module may be positioned on a code reader main circuit board such as shown in FIG. 8. A semiconductor light source 504, such as a laser diode 506 and lens 508 may be located on the base 502. The light source 504 generates a light beam projected along a first optical path indicated by arrows 510.

A generally planar, reciprocally oscillated reflector or mirror 512 is positioned above the base and located in the first optical path 510. The reflector directs the laser beam impinging on it toward a code symbol located in the field indicated by arrow 514. A spring coupled to the reflector 512, pivotably supports the reflector for oscillating movement. In the embodiment of FIG. 13, the spring is a leaf spring 516, fixed to the module at 518.

A drive mechanism is also supported on the base 502 for reciprocally oscillating the reflector 512. The drive may include a permanent magnet 520 connected to the reflector and coupled to an electromagnetic coil 522. When an alternating drive signal is applied to the coil 522, an alternating magnetic field is produced which acts to oscillate the permanent magnet and, in turn, to flex the spring and reciprocally oscillate the reflector about an axis generally perpendicular to the plane of the figure.

A photodetector 524, such as a semiconductor photodiode is also mounted on the circular base under the reflector. The photodetector generates an electrical signal indicative of light reflected from a target code symbol. A one-piece optical element 526, includes a beam folding section (such as generally planar section 528), and a collection mirror portion (such as curved portion 530). The optical element 526 is designed to receive retro-reflected light from the reflector and direct it to the photodetector 524.

Figure 14:
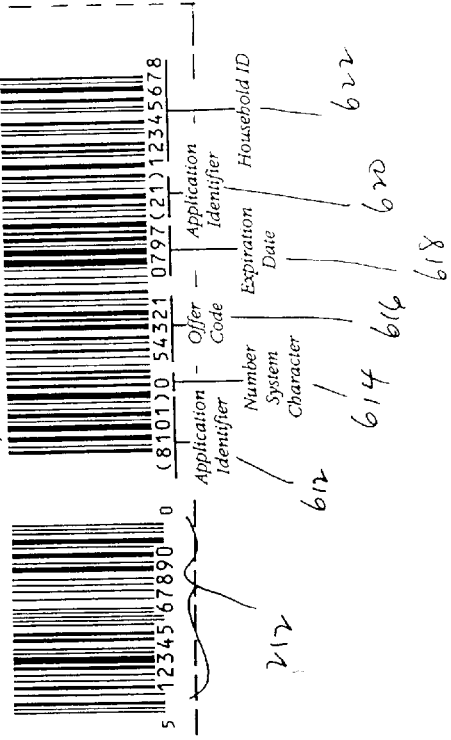
FIG. 14 is a sample coupon printed in a UCC/EAN-128 coupon extended code format.
Figure 14:
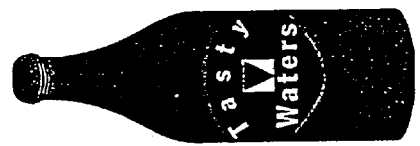

The electronic coupon redemption process discussed above is enhanced by using additional information encoded as a second bar code symbol in addition to the first bar code symbol 212. As shown for a sample coupon 600 in FIG. 14, the first bar code symbol 212 contains the manufacturer's identity and the product identifying information, as is standard. The second bar code symbol 610 contains the additional information arranged in a template or format in which a four digit application identifier 612 gives the format of the data to follow, a single digit number system character code 614 gives a manufacturer's number for products of the same manufacturer, a four digit offer code 616 gives a number assigned by manufacturers to code coupon offers, and a four digit expiration date 618, where the first two digits represents the month, and the last two digits represents the year, gives the date that the product, expires. The extended symbol 610 can also include a second two digit application identifier 620 followed by an eight digit household identifier 622.

The portable user apparatus or optical code reader 30, 210 is capable of reading both symbols 212, 610 on the extended code coupon 600. The coupon 600 was downloaded from a server on the Internet, or from a host terminal at the transaction site, and was printed on paper.

As previously described, an electronic coupon may be read into the memory 232 of the portable reader by scanning a printed symbol 610, by downloading data from an Internet server or from a host computer, or by manual keyboard entry, to store coupon data. The reader can also scan a product identifying code or symbol 212 associated with the product being purchased, preferably being affixed directly on the product, to store product data. The coupon data and the product data are transmitted, preferably by wireless transmission at a radio frequency, to a transaction system or host computer 234 remote from the portable reader. The coupon data and the product data are electronically matched in a memory of the host computer, which thereupon transmits an acknowledgment signal to the portable reader, or to a check-out terminal at the site of the sales transaction, again by wireless transmission. The acknowledgment signal confirms that a match has been made and that the coupon is valid and has been redeemed.

It is advantageous if the controller 214 includes circuitry for limiting the number of coupons that are stored in the memory 232. The limiting circuitry could also be located in the host computer 234. The limiting circuitry serves to insure that the number of coupons that are redeemed does not exceed a maximum approved by the manufacturer.

It is farther advantageous if the wireless transmission is initiated when the portable reader 30 is placed on the cradle 32, or when an actuator on the reader is manually actuated, or automatically after each reading of a product identifying code and coupon. The customer identifier stored in the memory 232 is useful in determining the origin and destination of each transmission. Advantageously, the customer identifier is provided in the household ID field 622 of the symbol 610.

VII. Electronic Coupon Delivery System

The system according to the present invention is designed to give consumers who purchase their own scanners with an easier way to save money on groceries, and other products, than is possible by clipping coupons. Our research shows that the inconvenience of clipping and managing coupons is the primary reason that coupons are not more heavily used. The research also shows that consumers would use coupons more heavily if they could simply scan them instead of clipping them.

Various systems that use the Internet to deliver coupons or other offers exist today, but none of them include the shopping list feature described in the attached documents. This feature provides several benefits. It enables the consumer to use the scanner to create a shopping list easily with his scanner, and edit it on his computer, helping him to avoid forgetting to purchase needed items. The system also reminds him to buy staples that he purchases periodically and automatically creates a list of all of the products a consumer generally buys, allowing him to peruse this list to make sure he hasn't forgotten anything. Perhaps more importantly, the described system shows how this list can be used with an Internet based coupon delivery engine to automatically deliver coupons for items on the consumers shopping list, or that are complimentary to items on his list etc. The system also can automatically add items to the shopping list when a consumer indicates that he is interested in taking advantage of an offer associated with that product. As you will see, this feature adds significant value, not only to the consumer, but to the packaged goods manufacturers who issue the coupons. The integration of the shopping list feature into the coupon delivery engine allows the packaged goods manufacturers to target customers with customized offers. The manufacturers are willing to pay more per delivered coupon when targeted this way, so this system can bring in more revenue from coupon delivery than other systems.

Another feature of the system is the Coupon Bank. This system provides benefits to the consumer, but it also makes it possible to keep track of which coupons are actually used by the consumer, a feature of great value to the packaged goods manufacturers. I believe this coupon bank is also unique.

The following embodiments describe various ways coupons can be printed at home by the consumer for redemption in a store. We also expect to eventually allow consumers to redeem coupons received via a home scanning/couponing system according to the present invention without taking any paper coupons to a store. Instead, the consumer will only need to identify himself to the store POS system with his customer card, and the POS system will contact our system which will inform the POS system what coupons are in the customers bank. Any products being purchased that have corresponding coupons will automatically be discounted. Alternatively, the customer can bring his scanner to the store, with his available coupons in the scanners memory. There will be a means of downloading available coupons to the POS system so the consumer can receive the discounts. The system will also be able to keep records of coupons delivered to consumers this way, which is valuable information to the packaged goods manufacturers.

The system delivers discount coupons to a consumer over the Internet. The system includes a bar code scanner that is used by the consumer to create a shopping list by scanning the UPC symbol on items in his house that need to be replenished. The system also includes other capabilities which combine to offer significant convenience and utility to the consumer, as well as enabling him to save money with the delivered coupons. Below is a list of the individual features and capabilities of the system of the present invention, any one or more of which may be incorporated in an embodiment thereof.

1. User scans grocery products as they are consumed, using a portable memory scanner. When the contents of the scanners memory are downloaded to the consumers P.C. a shopping list is automatically created. The user can add items to the shopping list at any time by scanning items and by than downloading the scanners memory again.
2. When user is planning to go to the store, he can examine products in his kitchen, scanning items that will need to be replenished soon, automatically adding them to his shopping list.
3. Items will also be automatically added to shopping list whenever user scans a coupon in a newspaper, magazine etc.
4. The user can print out the shopping list on his home printer before going shopping. The system will search for available coupons. If any items on the list have a coupon available, a coupon will be printed out along with the list. Available coupons can be from among those scanned, or from an on-line database. The printed coupons are redeemed at the store in the same way as coupons that were clipped out of a printed publication.
5. Special paper for printing coupons can be made available. This paper will have perforations, allowing the coupons to be easily separated for easy scanning at the store.

6. Items on the list which have coupons available will be highlighted on the printed list to remind the user that coupons are available, while shopping.
7. The list can be examined on the computer screen before printing, allowing the user to edit the list.
8. The system can automatically examine the shopping list and offer to provide coupons for products that are competitive with items on the list. The user can choose to accept the offered product. When he does this a coupon for the new product is sent and the new product is added to the list. The product that was replaced can be removed from the list. If there was a coupon available for that product it can be saved for a future shopping trip. If the consumer does not choose to purchase the substitute product at that time, the coupon for that substitute product can be added to the coupon bank for use in the future.
9. The system can offer coupons for products that compliment products on the list. For example, the system can offer a coupon for hot dog rolls if hot dogs are on the list. If the consumer does not choose to use that coupon at that time it can be saved in the coupon bank.
10. The system can monitor the frequency with which items are purchased, and remind the user that he might need to buy an item because he has usually replenished it by now. It can offer him a coupon for that item, or for related items at that time.
11. A coupon management system can be provided that allows the user to browse the list of coupons he has collected. The list will flag coupons that are nearing their expiration date, reminding the consumer to use them before they expire. An icon can also pop up on other screens that the consumer might use for other services. For example, an Icon will pop up on his shopping list to indicate that a coupon for an item not on the list is about to expire.
12. The user can click on any coupon on his list and that product will be added to his shopping list. The coupon will than be printed when the shopping list is printed.
13. Recipes for couponed products can be offered. Other ingredients needed for a recipe can be automatically added to the list if the consumer wishes to do so. Coupons can be offered for those added ingredients.
14. Users can collect "points"0 for using coupons collected through this system. Free merchandise can be offered in exchange for points.
15. The user can take the scanner to the store and scan items that he might want to buy on future shopping trips. These items can be added to a special reminder list, or be brought up as a reminder next time the user is examining his shopping list. Coupons for these items, or for similar items can be offered.
16. A staples list can be automatically compiled which includes all items bought more frequently than a predetermined interval. For example, it can include items bought at least once a month, or at least one out of two shopping trips. User can use this list to remind him to check his supply of these staples before going to the store.
17. Nutritional information can be made available for products with coupons, or for other products on the shopping list, even if coupons are not available.
18. The system can be expanded to enable the user to take the scanner, loaded with the edited shopping list and coupons, to the store. The scanner can be placed into a kiosk, which can print out an aisle sorted shopping list. The kiosk will also capture the coupons and send them to the POS system when the user is checking out, enabling paperless coupon redemption. Alternately, if paperless redemption is not possible at that store, the kiosk can print paper coupons that the user can redeem in the usual manner.

Another embodiment would be to have the coupons downloaded to the store directly from the service providers web server when the consumer buys couponed products. This eliminates the need to bring coupons to the store and for any printing of coupons, but requires the presence of a paperless redemption system.
19. The system will display the total amount a user has saved to date, and how much he will be saving on his next shopping trip (based on his present shopping list).
20. The system can automatically offer coupons to the user based on items in the staples list or in the reminder list (the list of items due to be replenished, based on past history).
21. The system can supply manufacturers coupons, as well as retailers coupons. It can also be expanded to enable individual retailers to make offers to selected customers. This can increase loyalty to a particular store.
22. The system can keep track of every product that a consumer ever put on his shopping list, or keep track of everything on the list for the last year or month etc. It will than be able to offer coupons for any of these items, or complimentary items, or competitive items when they become available.
23. The system can remind users to change batteries on their scanner, based on how many scans have been downloaded. New batteries can be ordered by clicking on an Icon. Heavy users can be offered free batteries, or batteries can be sent automatically after a predetermined number of scans have been downloaded.
24. If the user designates which store he generally intends to shop at, the system can send offers from that store.
25. If the consumer enters his zip code the system can send offers from stores in his area.

A system can be created that will create incentive for consumers to obtain inexpensive scanners, such as the Symbol CS-1504. This system will provide enough utility to a consumer that the consumer can justify purchasing the scanner.

In its simplest form, the only hardware the consumer needs to use this system is a bar code scanner and a home computer. The scanner will be shipped with information enabling the consumer to download application software via the Internet. This software will enable the consumer to have access, over the Internet, to several services.

The most important service enables the consumer to easily and conveniently collect coupons at home. This is important because marketing studies show that this is perhaps the most attractive service a scanner can provide to a consumer. Many consumers clip coupons but find the clipping tedious and the management of the coupons cumbersome. A service that makes coupon collection easy will appeal to consumers because they will expect to use coupons more frequently than they are presently willing to do, and therefore save more money. It is easy for a consumer to decide to purchase a scanner if he knows that he will be able to obtain enough discount coupons to return more than the cost of the scanner.

In addition, the packaged goods manufacturers, who issue the coupons to promote their products, are willing to pay a fee to a service provider who delivers the coupon to a consumer. A business that creates this system will therefore be able to collect this fee from the packaged goods manufacturer each time a consumer uses the system. This enables the service provider to sell the scanner at a very attractive price. For example, he might sell the scanner at cost and make his profit from the packaged goods manufacturers each time the consumer uses the scanner to obtain a coupon.

The system will only provide a scanner to a consumer who is sufficiently interested in using the system to spend a small amount on the scanner. This avoids the need to distribute large quantities of free scanners, many of which will end up in the hands of people who are not interested in using them. In addition, unlike prior art systems the service provider who operates this system will be entirely in control of the content and service he provides. This avoids the problem experienced by prior art systems in which users scan UPC symbols on various products, only to find there is no offer or information related to that product available. This greatly diminished the perceived usefulness of the prior art systems. Another advantage of this new system is that there is no need for the service provider to make arrangements with very large numbers of other businesses to provide content. The business model of prior art systems depended on the support of numerous other companies to continually provide content that is up to date and useful to the consumer. Without this cooperation, from companies who had little motivation, there was no reason for the consumer to use the scanner, and there was certainly no reason for the consumer to pay anything for the scanner.

A consumer who obtains a scanner for use with this new system can use it in several ways. Each of these ways will provide a service in the form of increased convenience or increased savings. One way is to use the scanner to create a shopping list by scanning grocery products as they are consumed. When the consumer is ready to go to the supermarket, he downloads the scanner memory into his home computer, which sends the UPC numbers of the scanned products to the service providers web server. The UPC numbers are compared to a database, and a shopping list is created that includes complete item descriptions. The system will compare the items on this shopping list to another database that contains available discount coupons. If any items on the list have a coupon available, a coupon will be sent to the consumer (I will describe how this can be done later). In addition, the system can send coupons for complementary products, such as offering a coupon for hot dog rolls if hot dogs are being purchased. Another possibility is to send coupons for products that compete with a product on the shopping list. For example, if Coke is on the list, Pepsi might offer a coupon to change the consumers buying choice. The consumer prints out the shopping list on his home computer. The list highlights any item on the list for which a coupon is being provided.

The consumer can also create a shopping list that includes items that are not already on hand in his kitchen. To do this, he can take the scanner to the store and scan items he might be interested in buying on a future shopping trip. These items can be stored in his home computers memory and displayed as a reminder next time he is preparing a shopping list. The computer can also monitor his buying habits to determine which items are purchased frequently, at what intervals various items are generally purchased etc, so as to enable the computer to create a list to remind the consumer to buy commonly purchased items, even if he has not scanned them recently, or to remind him that he is due to replenish an item that is consumed regularly. Each time a consumer is preparing his shopping list he can peruse this reminder list, and can move items onto the shopping list as desired. The system can offer coupons for items on the reminder list to motivate him to buy them during his next shopping trip.

The system can be used to create separate shopping lists for different stores. For example, it can create one list for the supermarket, and another list for the drug store. Many items purchased in drug stores can be identified by the system character 3 in the UPC number. Alternatively, the UPC database can contain information about the kind of product it is, allowing it to automatically be placed on the proper list. Coupons that are issued by retailers, as opposed to by the packaged good manufacturers can be offered to the consumer as items are placed on the list for a particular kind of store.

The scanner can also be used to scan discount coupons printed in newspapers, magazines etc. When the scanner memory is downloaded the coupon bar codes will be compared to a database, and coupons for the same products as the original printed coupons will be sent to the consumer. It will also be possible to send coupons for complimentary or competitive products, as described above. Coupon codes and UPC codes from products can be intermixed in the scanners memory. The system will be able to distinguish between them and respond as is appropriate for each kind of coupon.

This system also enables a consumer to obtain discount coupons without having to receive anything sent through the mail, which might be desirable in these days of terrorist activities.

The service providers web sight can also display coupons offered by various packaged goods manufacturers on a large variety of products. The consumer can click on coupons he is interested in, enabling him to obtain them as described below.

It will also be possible to create special promotions or contests for users of this system. Subscribers can be sent periodic notices of special offers via e-mail. They can than come to the service providers web page to get coupons for the offer.

Packaged goods manufacturers might not want to send coupons for a specific product to a given consumer more than one or two times, or maybe not more than once per month, for example. The system can keep track of how many coupons a consumer has receive for any item, and when the coupon was last receive. This will allow the system to prevent distributing coupons beyond limits set by the packaged goods manufacturer.

There are various ways coupons can be delivered to the consumer. If the consumer has a printer connected to his computer he can print the coupon at home. In most cases consumers will have a printer that prints only on 8.5×11 inch paper. Several coupons can be printed on each sheet of paper. These coupons will each have a bar code on them along with a description of the product for which they provide a discount. They can be redeemed at a supermarket in the same way as any other paper coupon. This may be a little inconvenient because shoppers will still need to clip the coupons apart, eliminating the convenience of scanning coupons. There are several ways this can be handled. One way is to supply special printer paper with the scanner that is perforated to make it easy to tear apart individual coupons. Around 20 coupons can be printed on each sheet of paper. This paper can be replenished by mail when the consumer clicks on a designated symbol displayed when they access the service providers web page. Another way is to make a strip printer available to consumers who use the system frequently. This printer, which can print out individual coupons, can be offered at a minimum price because it will encourage the consumer to use the system. Whichever type of printer is used, the paper can be pre-printed with a logo to identify it as coupon obtained through this service, or a logo can be printed along with the rest of the coupon, allowing the consumer to use ordinary paper if he prefers, or if he has run out of perforated paper.

Another way to provide coupons is to place kiosks in supermarkets that include printers. The shopper places his scanner in a download well in the kiosk, and his coupons are printed out. Yet another way is to allow electronic redemption. To do this, the consumers scanner would be downloaded at the point of sale, by placing it into a download well. The coupon bar codes stored in the scanner would be compared to the items actually purchased, and the discounts would be provided. Any coupons that were used this way would be subtracted from the scanners memory so they could not be used again.

This system can also provide additional services to the consumer. It can provide a coupon management finction by allowing the home computer to store any coupons until such time as the consumer was ready to use them. Coupons can be stored if they were obtained by scanning, or if they were obtained over the Internet from the service providers web sight. Available coupons could be displayed on the computer screen allowing the consumer to select the ones wanted for a particular shopping trip. The selected coupons could be provided to the consumer in any of the ways described above. Others would be saved for future use. The system would be able to automatically purge expired coupons, and it could highlight coupons that would expire soon, to notify the consumer that they should be used before they expire. Each time a consumer selects a coupon for use for a particular shopping trip, coupons for complimentary or competitive products can also be offered. When the selected coupons are printed, the computer can display the total savings that the consumer will realize when he redeems them. The computer can also keep track of total savings over varying time periods, such as savings per week, per month, or total savings realized since the consumer originally acquired his scanner. This can encourage him to continue to use his scanner frequently.

The system can also provide nutrition information and recipes for items on the shopping list, or for complimentary or competitive products.

It will, of course, be important to encourage consumers to obtain and use the scanners. The biggest barrier will be to make them want to make the initial investment in the scanner. A good way to do this is to offer coupons worth as much or more than the cost of the scanner to the consumer when he purchases a scanner. When a consumer buys a scanner and contacts the service provider for the first time he will be asked to provide some profile information. In return for that he will be mailed coupons specifically selected to be appropriate for him, based on this profile. This way he will be able to quickly recover his investment in the scanning hardware. The service provider will also immediately receive some revenue from the packaged goods provider for sending these coupons to individuals selected as likely customers for the packaged goods manufacturers products.

The consumer goes on to accrue further savings as he uses his scanner, and each time he does so the service provider also is paid for providing the coupons to the consumer.

The scanner will be purchasable directly from the service providers web page. When this is done, the consumer will fill out his profile information at the same time that he orders his scanner so his customized batch of coupons can be shipped to him along with the scanner.

Some consumers might wish to take advantage of the coupon services without wanting to buy a scanner. This will be less convenient for him, but will still provide savings to the consumer by offering him coupons related to items on his shopping list, and it will still provide an income to the service provider. The web sight should therefore be set up to allow manual entry of shopping lists as well as the numbers encoded in the bar codes on coupons that the consumer may have from magazines or newspapers.

The service provider will be in possession of information that will be valuable to the packaged goods manufacturers. His information, for example, can be used to measure effectiveness of advertising campaigns, or to determine who buys certain kinds of products. This information can be sold for additional income.

The web portal will also be needed. Some advertising will be necessary because consumers will not use this system if they don't know that it exists. Beyond that, every scanner sold will be paid for by a combination of the price paid by the consumer, and by payment from packaged goods manufacturers for the initial batch of coupons sent to the consumer upon initially signing up for the service. Every time a consumer scans a coupon, or whenever coupons are sent to the consumer to promote complimentary or competitive products, the service provider gets paid by the packaged good manufacturer, while incurring no additional expense.

We have devised a system that allows consumers to capture discount coupons that can be redeemed for discounts on products that can be purchased at retail stores such as supermarkets, drug stores, convenience stores and department stores. These coupons are provided by packaged goods manufacturers to entice consumers to purchase their products. Coupons of this kind are commonly found in inserts in newspapers, magazines etc.

Many consumers use these coupons, but most dislike the processes of clipping the coupons out of printed publications, storing the coupons, remembering to bring them to the store, sorting coupons, discarding expired coupons, etc. The consumer coupon scanning system described here addresses these issues, making the process of obtaining and redeeming coupons much easier. In addition, the system makes it easy for the consumer to obtain additional coupons, beyond the ones available to them in printed form. This allow the consumer to obtain discounts on a larger percentage of the products he purchases.

This system also offers a service to the packaged goods manufacturers who issue the coupons, because it allows them to reach consumers who would otherwise not take advantage of their offers. This means that the manufacturers get more opportunity to promote their goods to the consumers, or can reward loyal customers.

Retailers also offer coupons for store brand merchandise. This system can also be used to obtain these coupons.

This system offers advantages to the consumer, to the retailer, and to the packaged goods manufacturer. A company who creates a system will also benefit because the manufacturers are willing to pay a fee for every coupon delivered to a consumer. It is therefore in the interest of such a company to provide as many services as possible to a consumer, to encourage the consumer to use this system to obtain and use coupons. These services should include providing easy ways for the consumer to collect, organize and use the coupons. We have created a group of services which, when combined, in whole or in part, are compelling enough that consumers will be willing to make use of the system.

Others have proposed various coupon gathering systems. These systems have suffered from several drawbacks. In general, they require that a consumer make an investment in hardware needed to use the service or to join and pay dues to a club etc. Consumers are naturally skeptical of these systems because they cannot know if the value of the coupons and other services received will justify the investment they must make. The more they invest up front, the lower the likelihood that they will eventually recover all that they have invested and begin to save, which is the primary thing they are interested in doing. It is therefore advantageous to minimize the investment a consumer must make.

Another disadvantage of previously proposed systems is that they generally cannot function without significant infrastructural change in the stores where the consumer will redeem the coupons. Another problem with existing systems is that consumers can only redeem coupons in stores that have installed this new infrastructure, greatly reducing the usability of the coupons, especially at the early stages of the development of the system. This leads to a chicken and egg problem where a consumer is unwilling to invest anything in the system because his ability to use it is limited, and the store is unwilling to invest in the new infrastructure because there are not enough consumers enrolled with the system to justify the investment.

Yet another problem with existing systems is that they require changes to the process by which retailers are reimbursed for discounts they provide to coupon users. This requires the implementation of new systems involving the packaged goods manufacturers, the retailer and the coupon clearing houses. This is an expensive and time consuming process that disrupts long established ways of redeeming coupons. It is not in the interest of the clearing houses to cooperate in these changes because it threatens their income.

Another disadvantage of some existing systems is that consumers can only obtain discount coupons by using kiosks in a store. This is inconvenient, requiring them to operate the kiosk, possibly while other consumers wait their turn. The coupons obtained this way are not necessarily related to products the consumer plans to buy on this particular trip, so they might not be used.

As you can see, existing systems are capable of providing discount coupons to consumers, but the consumer must make an investment he might be unwilling to make. In addition, these systems offer very little added convenience to the consumer, and in some cases add significant inconvenience. In addition usability is limited by lack of existing infrastructure, which reduces the value to consumers and discourages them from making any initial investment to obtain the use of these systems.

The improved system proposed herein overcomes all of these problems. It works as follows.

This system is based around a small portable bar code scanner, such as the CS-1504 which is built by Symbol Technologies. A consumer can obtain this scanner and use it in several ways to obtain coupons, and to perform other finctions that make it easy and convenient to use the coupons when purchasing products. The consumer can than use the coupons in any store that normally honors coupons because the store can be reimbursed for them using the existing infrastructure.

The scanner can be purchased directly from the company that operates this coupon scanning system, e.g. the service provider, by going to the service providers web sight, which will sell the scanners. Alternatively, the scanners can be purchased from a retailer. In either case, the consumer who buys a scanner obtains immediate access to a list of available discount coupons on the service providers web sight. He is permitted to select coupons from the list that are for products he would like to buy. He can select coupons of a total combined value such that their value substantially offsets the cost of the scanner. For example, if the consumer paid 20 dollars for the scanner, he can select 15 dollars worth of coupons. Alternatively, the service provider might wish to provide greater motivation to get consumers to use his service, and might actually offer coupons that have a value greater than what the consumer paid for the scanner.

The coupons selected by the consumer will be sent electronically, via the Internet, to the consumer so that they can be printed out before the consumer goes to the store to buy the couponed items. These printed coupons will have bar codes on them allowing them to be scanned at the store, just as coupons clipped out of printed publications would be. It is also possible to include additional data in the bar code printed on these coupons. For example, the bar code can indicate that the coupon was obtained through this system, which can allow the packaged goods manufacturer to verify that his coupon has been redeemed. The coupon can also indicate who the consumer is, or the consumer can be identified by scanning his frequent shopper card that was provided to him by the retailer.

The system also provides several other ways for the consumer to obtain coupons, and it also offers other services that offer enough convenience to encourage him to use the system. For example, the consumer can use the scanner to automatically create a shopping list. To do this he uses the scanner to scan the UPC symbol on products as they are consumed, before the package is discarded. The scanner stores the UPC number in its memory. When the consumer is ready to go to the store, he connects the scanner to his home computer and the UPC numbers stored in the scanners memory are downloaded to the computer. These numbers are sent to the service providers web server and are compared to a database of UPC numbers to determine what products they represent. The product descriptions are than sent back to the consumers computer and are displayed in the form of a shopping list. The consumer can edit the list if he wants, ant than print it out so he can take it to the store. If the consumer indicates which store he intends to shop in, the list can be sorted by aisle, making it easier for the shopper to find the things on his list. A map of the store can also be printed with the locations of listed items marked on the map.

When the UPC numbers of items scanned in the consumers home are sent to the service providers web server, it can compare those items to another database of available coupons, to see if coupons are available for any items on the list. If so, coupons can be sent to the consumer for printing out with the shopping list. In addition, the system can send coupons for complimentary products that are not on the list. For example, the system can offer a coupon for hot dog rolls to someone whose list includes hot dogs. Alternatively, the system can send coupons for alternative products. For example, if Coke is on the shopping list the system can offer a coupon for Pepsi. The consumer can review these offers and can designate the ones he is interested in. These items will be added to the shopping list and the associated coupons will be sent so that they can be printed out along with the shopping list.

Before going to the store, consumers generally look through their refrigerator and pantry to determine what might need to be replenished. If he has a scanner, he simply scans UPC on the item and it will be added to his shopping list when the scanner is later connected to his home computer. The system will also offer coupons for these items, if coupons are available, as well as coupons for complimentary or alternative products, as described above.

Another way the consumer can obtain coupons is by scanning the bar codes on coupons in printed publications. The system will be able to distinguish these bar codes from the bar codes on packaged good items, and will recognize them as codes representing coupons. These codes will be compared to a database of coupons, and coupons equivalent to the scanned coupons will be sent to the consumer. The consumer has scanned the coupon because he wants to purchase the discounted product, so that product will be automatically added to the shopping list.

Sometimes the consumer may not want to purchase a product for which he has a coupon on his next shopping trip. In this case he can store coupons in electronic form in a "coupon bank" for use at a later date. This coupon bank can reside either on his computer or at the service providers web sight. In the future, when the consumer is creating his list for his next trip to the store the system can remind him of what coupons he has available, allowing him to add that item to his list if he wants to. Alternatively, if an item with a coupon in the coupon bank is scanned while the consumer is creating his shopping list, the coupon will be transferred from the coupon bank so it can be printed out for redemption.

When the shopping list is printed out, items for which coupons were also printed will be highlighted on the list, reminding the consumer that coupons are available. If any items with associated coupons turn out not to be available in the store, due to being out of stock, etc. The consumer can return unused coupons to his coupon bank by scanning the bar code on the unused coupon.

The system can also remind consumers when coupons are nearing their expiration date, so the coupons can be used while still valid.

One thing that consumers dislike most about using coupons is the necessity to clip them out of printed publications. When this system is used several coupons will be printed on a single page. The consumer might need to separate these into individual coupons before presenting them at a store (stores with hand held scanners will not need the coupons to be separated). If so, he can tear or clip them apart, which is still easier than tearing them out of the newspaper or magazine, and eliminates the problem of destroying whatever is printed on the other side of the page. Alternatively, the consumer can obtain special printing paper, from the service provider, that is pre-perforated such that it is easy to tear the coupons apart. This paper can also be pre-marked on both sides, making it difficult for these coupons to be reproduced with a photocopy machine.

The system can monitor the frequency with which a consumer normally purchases products and can remind him that it is time to purchase that item again, It can offer a coupon for this item at that time, or it can offer a coupon for an alternate or complimentary product.

Users of this system can also make use of other services. The system can provide recipes for items on the shopping list, or coupons in the coupon bank. It can also supply nutritional information about these products.

The system can keep track of all items that were ever on the consumers shopping list. The consumer can browse this list as a means of helping plan his shopping trip. Items on this list that have coupons available can be highlighted, motivating the consumer to add these items to his immediate shopping list so he can take advantage of the coupon.

As an additional incentive and reward to users who obtain coupons using this system, the service provider can offer "points" to consumers for each coupon obtained from this system. Alternatively, points can be offered for coupons obtained from this system when they are redeemed.

Consumers can take the scanner with them when they go shopping. If t hey see any item that they think they might want to buy on their next trip they can scan the UPC code on that item. When they get home, that item can be added to their next shopping list. If a coupon is available for that item, it can be provided. This will also allow consumers to obtain recipes or nutritional information about products that were seen in the store.

Whenever the consumer is accessing the service providers web sight, for any of the services mentioned above, the total amount of savings accrued by the consumer to date can be displayed. This will motivate him to continue using the system to receive further savings. The amount that the consumer will be saving on his next trip to the store, based on coupons that are available for items on his shopping list can also be displayed.

As stated above, a significant advantage of this system over other similar systems is that it does not require any special equipment to be installed in a store to allow a consumer to redeem coupons obtained by the use of this system. There are, however, additional services that can be provided if hardware for this purpose is installed in a store. Retailers will be motivated to install this hardware, which can be made available from the service provider, because the hardware can offer additional services to consumers who shop at the retailers stores. For example, a kiosk can be installed in a store. The consumer can bring his scanner from home and download the contents of the scanner memory to the kiosk. This enables the kiosk to print out an aisle sorted shopping list and/or coupons, if the shopper does not have a computer at home. Coupons stored in the scanner can also be sent to the store POS system for paperless redemption, whenever systems are in place to allow that. The consumers scanner can also be used for self check-out by scanning the UPC symbol on items he places in his shopping cart. Details of this system are disclosed in another application.

A unique feature of this system is the shopping list feature. It adds utility and convenience for the consumer and it also is used by the service provider to verify that consumers are actually intending to use the delivered coupons. This is of value to the packaged goods manufacturers because it verifies that their coupons were actually used. This greatly increases the value of this system to the manufacturers because it enables them to use the system to test the efficacy of promotions, determine who their best customers are etc.

The coupon bank adds to the systems ability to monitor the use of coupons. By allowing a consumer to leave coupons in the bank until such time that he intends to use them, it greatly reduces the likelihood that he simply printed out the coupon and than didn't use it. A consumer is not likely to print out a coupon without using it. If he prints one out, but doesn't use it, perhaps because he didn't get to the store when he expected to, or because the item was out of stock, he can return it to the bank by scanning its bar code. The combination of the shopping list and coupon bank therefore combine to create a system that can verify to a high level of probability that the coupons delivered to a consumer were actually used. All other systems that attempt to verify the use of coupons do so by monitoring the flow of coupons from the retailers back to the CPG's (consumer packaged goods manufacturer). There is no universally existing infrastructure in place to do this, so it is generally done on an ad hoc basis, each organization implementing its own system. Our system eliminates the need to install any additional systems or infrastructure to perform this valuable service.

U.S. Pat. No. 5,250,789 of Edward L. Johnsen describes a display/coupon organizing/shopping list system that is used in a store mounted on a shopping cart. It also mentions that a scanner can be attached to a home computer to create a shopping list that will be sent to the store via modem for displaying on the cart mounted display.

A primary difference between the present invention and U.S. Pat. No. 5,250,789 is that the present invention does not require any additional infrastructure in the store to enable a consumer to use it. No cart mounted display or remote access to a stores UPC database is necessary. These things could be added to my system, and might provide some additional utility, but they are not required. This is an important distinction because eliminating the need for special hardware in each store, as well as eliminating the need to connect to a stores UPC database allows users of my system to shop, and get discounts, at any store they want, without any requirement that the store be involved with my system in any way. This means that consumers can use the present invention at any store as soon as they obtain a scanner and sign up for the service. There is no need to wait for their particular store to join my system, install cart mounted displays in their store etc. It also means that there is no issue of finding a source of financing to pay for the design and installation of expensive hardware in every store, allowing the operator of my proposed system to develop the system at much lower expense and to expand the system across the country, or the world much faster without having to sell the system to each individual retailer.

The use of the home scanner is different in the present invention than in the Johnsen system. The prior are patent describes using a cash register printout with bar codes that can be scanned at home to create a shopping list, e.g. a wand scanner that would be tethered to a home computer, as opposed to a portable laser scanner. A tethered wand would make it impractical to scan actual product packages in the kitchen, as the products are consumed. A wand scanner cannot read the bar codes on real world grocery products very well, and it would be impractical to bring the package for every consumed item to a room outside the kitchen where the home computer might be located. It would, however, be practical to bring a cash register tape to the room where the home computer is located, and the bar codes printed on the tape would be readable by a wand scanner.

A portable scanner that is used to scan the bar codes on consumed products also relieves the consumer of the necessity of saving the cash register print out with the bar codes on it, so he can use it to generate the shopping list for his next trip, as would be necessary with the Johnsen system. With the system of the present invention, the shopper can throw the cash register print out away, or loose it, and he can still generate the shopping list for his next trip. The Johnsen system also doesn't provide a way for consumers to add items to their shopping list that were not originally purchased from a store that produces a bar coded cash register printout. With my system any item can be scanned onto the shopping list, by scanning its package, no matter where or when it was purchased.

U.S. Pat. No. 5,250,789 discloses a printer mounted within the cart mounted display unit for printing coupons. It does not disclose the consumer using a printer at home to print coupons that he will bring to the store with him. This patent also discloses the cart mounted display sending an electronic coupon via R.F. to the store computer so the consumer can get a discount without tendering a paper coupon. It does not disclose sending an electronic coupon to the store computer from the consumers home computer, or from a remote computer operated by a service provider. These things are both included in the couponing system of the present invention.

The Johnsen patent speaks of matching coupon bar codes to product bar codes within the cart mounted display device. This is different from the system of the present invention because the invention does this matching before the consumer or his shopping list comes to the store. Coupons and items on the shopping list are matched either by the consumers home computer, or by the service providers computer, which reads the shopping list and compares it to a database of available coupons. Offers for alternate products, or complementary products are also made to the consumer at home. This allows him to edit his shopping list at home, to either accept or reject these offers before he goes to the store. He therefore goes to the store with all accepted offers already available to him in the form of printed coupons and a printed shopping list that he can use in any store he chooses. There is no need for him to go only to a store that has the cart mounted display devices described in U.S. Pat. No. 5,250,789.

This prior are patent also describes that an aisle sorted shopping list can be created by comparing items on the shopping list to an item location database from the store to create an aisle sorted shopping list, or a map of the store showing where each of the items on the shopping list can be found. This can also be done with my system, if the store is able to supply the item location information to the home computer. A difference between system of the present invention and the Johnsen system, however, is that the Johnsen system contemplates bringing the aisle sorted shopping list to the store on a floppy disk so it can be displayed on the cart mounted display unit. With system of the present invention the aisle sorted list would be printed out at the consumers home using a printer connected to his home computer. This, again, eliminates the need for the store to install the cart mounted display units.

Various initiatives are under way, to provide information to consumers who are shopping, in a supermarket or other kind of store, with information about special promotions available in the store. Some of these prior art systems display advertisements to consumers who are moving around a store. These advertisements change depending upon where the consumer and mobile device is located at any particular time. For example, mobile device would display an offer for a brand soda when the shopper is in the soda aisle.

In some cases the mobile display device may also include a bar code scanner and a radio. The bar code scanner can be used to allow the shopper to identify himself to the system enabling the system to send targeted offers. Alternatively, the scanner could be used to scan items the shopper is purchasing, to allow the system to offer a promotion of a complimentary product, etc. The scanner also allows the system to be used for self check-out.

The radio allows the movable system to be in real time communication with the store system so as to allow downloading of offers and various promotional displays, or of the price or description of items that are scanned.

Cellular phones may also be fitted with a bar code scanner, either as an add-on attachment or with the scanner integrally incorporated into the phone or by using an imager that is installed in the phone for capturing and transmitting pictures. A phone/scanner combination such as this would be capable of performing all of the self check-out finctions described above if there was an easy way for the consumer to cause the phone to communicate with the store POS system. This can be facilitated by the creation of a service that interconnects the phone (over the wide area network provided by the cell phone service provider) and the store computer system.

A system like this can be enhanced according to another embodiment of the present invention if the cell phone or the scanner module connected to the phone also includes a means of determining its location within the store. This will allow it to display promotions that relate to the location in the store where the consumer is presently located.

The present invention thus provides a phone, or the plug-in module, that contains a sensor for the infra-red location beacons known in the art. Short range R.F. beacons could also be used. If the R.F. beacons had a range of only several feet, the Phone position would be determined within this accuracy whenever the cell phone received the signal from the beacon. The beacon (either R.F. or I.R.) would be constantly transmitting a signal that identifies itself. The phone would send this identification information to the store system that contains the promotional information via the phones wide area capability, and information would be sent back to the phone causing it to display a promotion that is related to the products that are near the beacon.

Other means of determining the phones location can also be used, such as G.P.S., sensing or R.F. tags in the immediate location, inertial guidance etc. However the location of the phone is determined, the combination of a position sensing device, a bar code reader and a cell phone offers some unique capabilities.

Figure 15:
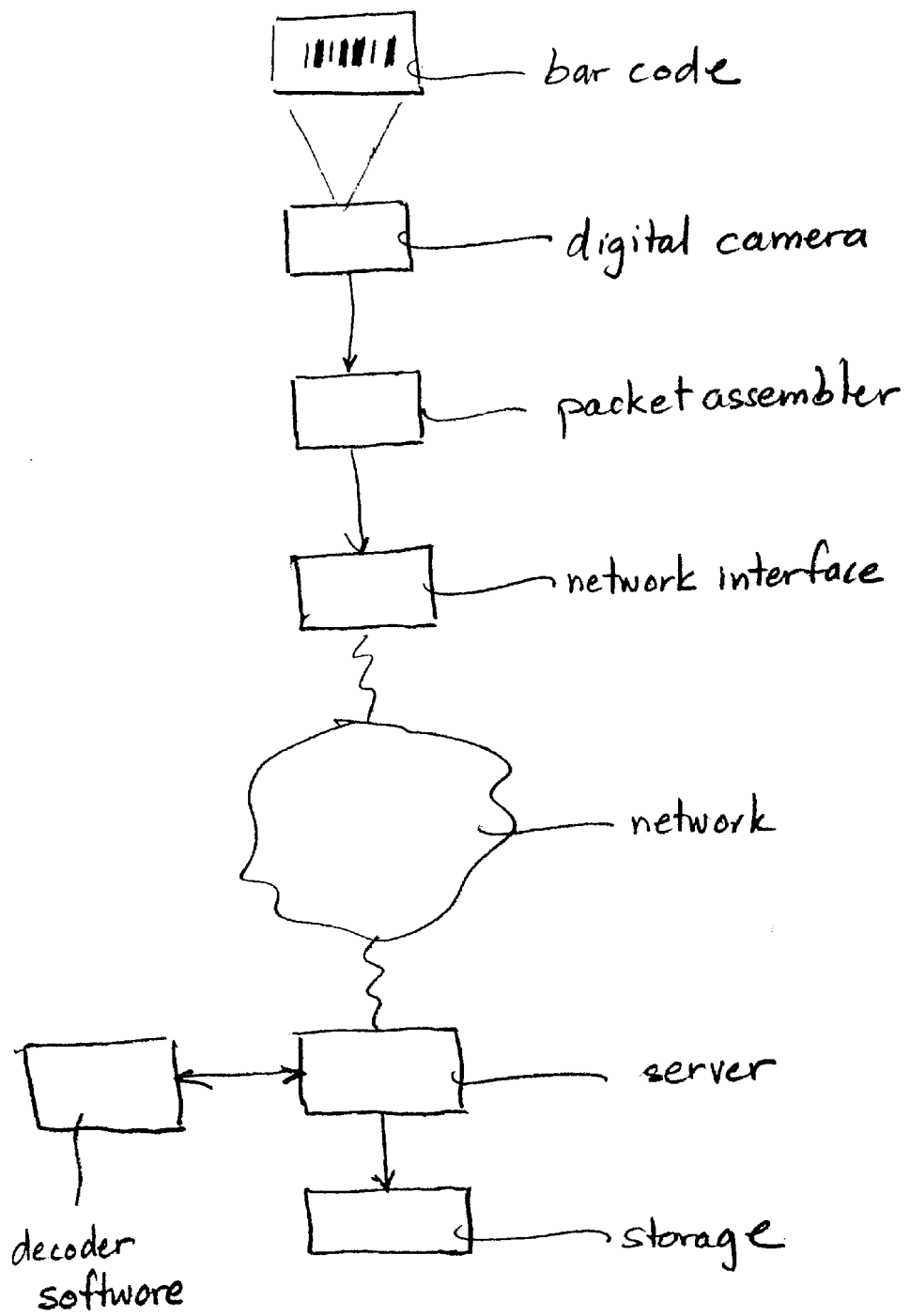
FIG. 15 is a diagram depicting another embodiment of the present invention.

As shown in the diagram of FIG. 15, the present invention also provides a method of reading a bar code on a target by taking a picture of the target including the bar code symbol with a digital camera by the user; processing the image into a digital data packet including the bar code image data; and transferring the digital data packet over a computer network to a remote server or host computer. At the server, the server performs a decode on the bar code image data and an acknowledgement of a decode is sent to the user over the network. The decoded data may be stored at the server or sent to the user, or to another user designated destination. The present invention also provides a system for decoding bar code symbols utilizing a remote host computer or network server, as depicted in the Figure.

Although the invention has been discussed with reference to certain personal bar code reader designs, housings, triggering mechanisms, marketing and couponing printing and processing systems, and other features of the disclosed embodiment it will be understood that a variety of readers, printers, housing styles and shapes, and triggering mechanisms could be used. Other conventional features of bar code reading systems can also be included if so desired. The invention is preferably implemented using miniaturized components such as those described herein or in the materials referenced herein, or otherwise known in the art. However, the scanner of the present invention is not limited to use in portable devices and can also be easily adapted for use in a stationary housing either of the "desktop", "table top" or "projection" variety, other systems, wherein the item on which the symbol resides is moved across the scanner head.

Additionally, even though the present invention has been described with respect to reading one dimensional bar codes, it is not limited to such embodiments, but may also be applicable to more complex indicia scanning or data acquisition applications such as two dimensional bar codes and matrix array symbols comprised of geometric shapes. It is conceivable that the present invention may also find application for use with various machine vision or optical character recognition applications in which information is derived from indicia such as printed characters or symbols, or from the surface or configurational characteristics of the article being scanned.

In addition to being packaged in specific personal scanner housings, the elements of the scanner may be implemented in a very compact assembly or OEM subassembly such as a single integral module or "scan engine". Such a module can interchangeably be used as the dedicated scanning element for a variety of different operating modalities and types of personal appliances or data acquisition systems. For example, the module may be alternatively used in a handheld manner, in a table top goose neck scanner attached to a flexible arm or mounting extending over the surface of the table or attached to the underside of the table top, or as a subcomponent or subassembly of a more sophisticated data acquisition system.

Each of these different implementations may be associated with a different modality of reading bar code or other symbols or marketing systems. Thus, for example, the hand-held scanner is typically operated by the user aiming the scanner at the target; the table top scanner operated while the target is moved rapidly through the scan field, or presented to a scan pattern which is imaged on a background surface. Still other modalities within the scope of the present invention envision the articles being moved past a plurality of scan modules oriented in different directions so the field of view allows at least one scan of a symbol which may be arbitrarily positioned on the article.

The module could advantageously comprise various optic subassemblies mounted on a support, and photodetection components, such as a photodiode, charge coupled or solid state imaging device. Control or data lines associated with such components may be connected to an electrical connector mounted to enable the module to be electrically connected to a mating connector associated with other elements of the data acquisitions system.

An individual module may have specific scanning or decoding characteristics associated with it, e.g. operability at a certain working distance, or operability with one or more specific symbologies or printing densities. The characteristics may also be defined through the manual setting of control switches associated with the module. The user may also adapt the data acquisition system to scan different types of articles or the system may be adapted for different applications by interchanging modules in the data acquisition system through the use of a simple electrical connector.

The scanning module described above may also be implemented within a self-contained personal appliance unit including on or more such components as keyboard, display, printer, data storage, application software, and data bases. Such a unit may be a cellular telephone, and also include a communications interface to permit the data acquisition unit to communicate with a host computer, or other components of a data processing system, or with remote computers through a local or wide area network or with the telephone exchange network, either through a modem, ;pca; area, wide area, or an ISDN interface, or by low power radio broadcast from the portable unit to a stationary or mobile receiver and thereafter to other system components.

It will be understood that each of the features described above, or two or more together, may find a useful application in other types of scanners and readers and marketing systems differing from the types described above.

While the invention has been illustrated and described as embodied in it is not intended to be limited to the details shown, since various modifications and structural changes may be made without departing in any way from the spirit of the present invention.

Without further analysis, the foregoing will so fully reveal the gist of the present invention that others can readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

We claim:

1. A method of promoting sales of products to consumers at a point-of-transaction site, comprising the steps of:

a) generating an electronic shopping list of the products to be purchased by a consumer by delivering a reader operable for electro-optically reading machine-readable indicia to the consumer, and by instructing the consumer to manually hold and aim the reader at the indicia identifying the products to be purchased, and to manually operate the reader to obtain product data corresponding to the products while manually holding the reader at a location remote from the point-of-transaction site;

b) transferring the shopping list to a computer on a network on which a database having coupon data is accessible and retrievable by the computer;

c) matching the coupon data an the product data, and retrieving the coupon data from the database that matches the product data transferred to the computer;

d) printing paper coupons from the retrieved coupon data; and e) delivering the paper coupons to the consumer for redemption at the point-of-transaction site.

2. The method of claim 1, wherein the steps of holding, aiming and operating the reader are performed in a residence of the consumer.

3. The method of claim 2, wherein the steps of holding, aiming and operating the reader are performed as the products are consumed in the consumer's residence, each product in its turn.

4. The method of claim 1, wherein the transferring step is performed in a single batch download to the computer.

5. The method of claim 1, wherein the coupon printing and delivering steps are performed in a residence of the consumer.

6. The method of claim 1, wherein the coupon printing and delivering steps are performed at the point-of-transaction site.

7. The method of claim 1, and further comprising the step of editing the shopping list after the transfer to the computer.

8. The method of claim 1, wherein the transferring step is performed by wireless transmission of the shopping list.

9. A sales promotion system, comprising:

a) a hand-held reader for generating an electronic shopping list of products to be purchased by a consumer, the reader being aimable by the consumer at machine-readable indicia identifying the products, and operable to electro-optically read the indicia and generate product data identifying the products while being held by the consumer at a location remote from a point-of-transaction site at which the products are purchased;

b) means for transferring the shopping list to a computer on a network on which a database having coupon data is accessible and retrievable by the computer;

c) means for matching the coupon data and the product data, and for retrieving the coupon data from the database that matches the product data transferred to the computer; and d) a printer for printing paper coupons from the retrieved coupon data, the coupons being physically deliverable to the consumer for redemption at the point-of-transaction site.

* * * * *